US009967900B2

United States Patent
He et al.

(10) Patent No.: US 9,967,900 B2
(45) Date of Patent: May 8, 2018

(54) METHODS AND APPARATUS FOR MULTI-CHANNEL MEDIUM ACCESS CONTROL PROTOCOL

(71) Applicant: QUALCOMM Incorporated, San Diego, CA (US)

(72) Inventors: Linhai He, San Diego, CA (US); Maksim Krasnyanskiy, San Diego, CA (US); Yacob Cohen-Arazi, San Diego, CA (US); Rajesh Kumar, San Diego, CA (US); Bibhu Mohanty, San Diego, CA (US); Rashid Ahmed Akbar Attar, San Diego, CA (US); Wenjia Lai, San Diego, CA (US); Danyang Cong, San Diego, CA (US); Qi Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 15/220,340

(22) Filed: Jul. 26, 2016

(65) Prior Publication Data

US 2017/0034847 A1   Feb. 2, 2017

Related U.S. Application Data

(60) Provisional application No. 62/199,896, filed on Jul. 31, 2015, provisional application No. 62/221,564, filed on Sep. 21, 2015.

(51) Int. Cl.
H04W 4/00   (2018.01)
H04W 74/06   (2009.01)
(Continued)

(52) U.S. Cl.
CPC ......... *H04W 74/06* (2013.01); *H04L 61/6022* (2013.01); *H04W 74/002* (2013.01); *H04W 84/12* (2013.01)

(58) Field of Classification Search
CPC ...................................................... H04W 74/06
(Continued)

(56) References Cited

U.S. PATENT DOCUMENTS 6,259,898 B1 * 7/2001 Lewis ................... H04W 92/02
                                                370/338
6,907,229 B2 * 6/2005 Shpak ................... H04W 48/20
                                                455/447

(Continued)

FOREIGN PATENT DOCUMENTS

EP         2365711 A1    9/2011
WO    WO-2008135330 A1   11/2008

OTHER PUBLICATIONS

International Search Report and Written Opinion—PCT/US2016/044305—ISA/EPO—dated Oct. 10, 2016.

(Continued)

*Primary Examiner* — Thai Hoang
(74) *Attorney, Agent, or Firm* — Knobbe, Martens, Olson & Bear, LLP

(57) ABSTRACT

Methods and apparatuses for communicating in a wireless communication network are disclosed. For example, one method includes determining, by a first access point, a polling schedule for communicating with one or more wireless stations on a first wireless communication channel, the polling schedule for a second access point on a second wireless communication channel. The method further includes transmitting, by the first access point, on the first wireless communication channel, transmission information to the one or more wireless stations, wherein the transmission information comprises information for the one or more (Continued)

wireless stations to receive a transmission from the second access point on the second wireless communication channel. The method further includes transmitting, by the first access point, on the first wireless communication channel, one or more packets to at least one of the one or more wireless stations in accordance with the polling schedule.

30 Claims, 14 Drawing Sheets

(51) Int. Cl.
 *H04L 29/12* (2006.01)
 *H04W 84/12* (2009.01)
 *H04W 74/00* (2009.01)

(58) Field of Classification Search
 USPC ...... 370/329–347, 310.2–326; 455/421–425, 455/445–452.2
 See application file for complete search history.

(56) References Cited

U.S. PATENT DOCUMENTS

| | | | | |
|---|---|---|---|---|
| 7,787,416 | B2* | 8/2010 | Gidwani | H04W 28/18 |
| | | | | 370/310 |
| 9,474,012 | B2* | 10/2016 | Edge | H04W 48/16 |
| 9,756,553 | B2* | 9/2017 | Soliman | H04W 48/08 |
| 2003/0026198 | A1* | 2/2003 | Diepstraten | H04W 74/0808 |
| | | | | 370/208 |
| 2004/0147223 | A1* | 7/2004 | Cho | H04L 12/66 |
| | | | | 455/41.2 |
| 2006/0270338 | A1* | 11/2006 | Mahany | H04B 1/692 |
| | | | | 455/3.01 |
| 2010/0074190 | A1* | 3/2010 | Cordeiro | H04W 48/16 |
| | | | | 370/329 |
| 2016/0112944 | A1* | 4/2016 | Zhou | H04W 36/0072 |
| | | | | 370/338 |
| 2017/0195944 | A1* | 7/2017 | Luo | H04W 48/08 |
| 2017/0331577 | A1* | 11/2017 | Parkvall | H04J 11/0079 |

OTHER PUBLICATIONS

Konishi S., et al., "A MAC Protocol Taking Account of Permissible Latency for Real-Time Applications", IEEE 18th International Symposium on Personal, Indoor and Mobile Radio Communications. PIMRC, IEEE; PI, XX, Sep. 1, 2007 (Sep. 1, 2007), XP031168942, pp. 1-5, ISBN: 978-1-4244-1143-6.

* cited by examiner

| Value | Use |
|---|---|
| 0x00 | Data |
| 0x01 | Accept |
| 0x02 | Data Start |
| 0x03 | SUM start |
| 0x04 | System Cycle Start |
| 0x05 | Handoff Request |
| 0x06 | Handoff Reply |
| Other | Reserved |

| Value | Use |
|---|---|
| 0x00 | Data frame |
| 0x01 | Management frame |
| 0x02 | Filler frame |
| 0x03 | System update msg |
| 0x04 | Open poll |
| 0x05 | Join (Type-A STAs) |
| 0x06 | Join (Type-B STAs) |
| 0x07 | Join (handoff) |
| 0x08 | Accept (for Join) |
| 0x09 | Reject (for Join) |
| 0x0A | Leave |
| 0x0B | Handoff |
| 0x0C | Rekey |
| 0x0D | OTA provisioning |
| 0x0E | OTA provisioning ACK |
| Other | (reserved) |

METHODS AND APPARATUS FOR MULTI-CHANNEL MEDIUM ACCESS CONTROL PROTOCOL

CROSS-REFERENCE TO RELATED APPLICATION INFORMATION

The present application for patent claims priority to Provisional Application No. 62/199,896 entitled "METHODS AND APPARATUS FOR ULTRA-LOW LATENCY WIRELESS NETWORK" filed Jul. 31, 2015, and Provisional Application No. 62/221,564 entitled "METHODS AND APPARATUS FOR MULTI-CHANNEL MEDIUM ACCESS CONTROL PROTOCOL" filed Sep. 21, 2015, both of which are expressly incorporated by reference herein.

BACKGROUND

Field

The present disclosure relates generally to telecommunications, and specifically to multi-channel medium access control protocol(s).

Background

The deployment of wireless local area networks (WLANs) in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. A set of STAs can communicate with each other through a common AP in what is referred to as a basic service set (BSS). Nearby BSSs may have overlapping coverage areas and such BSSs may be referred to as overlapping BSSs or OBSSs.

For some applications, the latency of existing WLANs may be too high. For example, industrial applications involving sensors and/or robotic controls may have a need to transmit control data with very low latency. Existing medium or media access control (MAC) protocols, however, may be optimized to maximize throughput at the expense of latency. Accordingly, control data, which may be relatively small in size, may be delayed by buffering, overhead, and other characteristics of existing MAC protocols. Further, some low-latency applications may incorporate numerous wireless stations. Existing MAC protocols may permit collisions between transmissions between different stations. As more stations are added, the number of collisions increases and results in greater latency. Accordingly, it may be desirable to provide a WLAN that supports reliable low-latency applications for numerous wireless stations over multiple channels.

SUMMARY

Various implementations of methods and apparatus within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims.

One aspect of the present disclosure provides a method of communicating in a wireless communication network. The method includes determining, by a first access point, a polling schedule, the polling schedule for the first access point to communicate with one or more wireless stations on a first wireless channel, the polling schedule for a second access point to communicate with the one or more wireless stations on a second wireless communication channel different from the first wireless channel. The method further includes transmitting, by the first access point, on the first wireless communication channel, transmission information to the one or more wireless stations, the transmission information comprising information for the one or more wireless stations to receive a transmission from the second access point on the second wireless communication channel. The method further includes transmitting, by the first access point, on the first wireless communication channel, one or more packets to at least one of the one or more wireless stations in accordance with the polling schedule.

Another aspect of the present disclosure provides a first access point configured to communicate with one or more wireless stations on a first wireless channel in a wireless communication network. The first access point includes a processor configured to determine a polling schedule, the polling schedule for the first access point to communicate with the one or more wireless stations, the polling schedule for a second access point to communicate with the one or more wireless stations on a second wireless communication channel different from the first wireless channel. The first access point further includes a transmitter configured to transmit transmission information on the first wireless communication channel to the one or more wireless stations, the transmission information comprising information for the one or more wireless stations to receive a transmission from the second access point on the second wireless communication channel. The transmitter is further configured to transmit one or more packets on the first wireless communication channel to at least one of the one or more wireless stations in accordance with the polling schedule.

Another aspect of the present disclosure provides another first access point configured to communicate with one or more wireless stations on a first wireless channel in a wireless communication network. The apparatus includes means for determining a polling schedule for communicating with the one or more wireless stations, the polling schedule for a second access point on a second wireless communication channel different from the first wireless channel. The apparatus further includes means for transmitting transmission information on the first wireless communication channel to the one or more wireless stations, the transmission information comprising information for the one or more wireless stations to receive a transmission from the second access point on the second wireless communication channel. The apparatus further includes means for transmitting one or more packets on the first wireless communication channel to at least one of the one or more wireless stations in accordance with the polling schedule.

In yet another aspect, the present disclosure provides a non-transitory computer-readable medium comprising code that, when executed, performs a method of communicating in a wireless communication network. The method includes determining, by a first access point, a polling schedule for communicating with one or more wireless stations on a first wireless channel, the polling schedule for a second access point on a second wireless communication channel different from the first wireless channel. The method further includes transmitting, by the first access point, on the first wireless communication channel, transmission information to the one or more wireless stations, the transmission information comprising information for the one or more wireless stations to receive a transmission from the second access point on the second wireless communication channel. The method further includes transmitting, by the first access point, on the first wireless communication channel, one or more packets to at least one of the one or more wireless stations in accordance with the polling schedule.

One aspect of the present disclosure provides a method of communicating in a wireless communication network. The method includes receiving, by a wireless station, on a first wireless communication channel, transmission information from a first access point, the transmission information comprising information for the wireless station to communicate with the first access point on the first wireless communication channel and a second access point on a second wireless communication channel different from the first wireless channel. The method further includes determining, by the wireless station, that one or more packets were not received from the first access point. The method further includes determining, by the wireless station, based at least in part upon the one or more packets not being received, a time to switch from the first wireless communication channel to the second wireless communication channel based at least in part upon the transmission information. The method further includes receiving, by the wireless station, data from at least one of the one or more packets from the second access point on the second wireless communication channel.

Another aspect of the present disclosure provides a wireless station configured to communicate in a wireless communication network. The wireless station includes a receiver configured to receive transmission information from a first access point on a first wireless communication channel, the transmission information comprising information to communicate with the first access point on the first wireless communication channel and a second access point on a second wireless communication channel different from the first wireless channel. The wireless station further includes a processor configured to determine that one or more packets were not received from the first access point, and determine, based at least in part upon the one or more packets not being received, a time to switch from the first wireless communication channel to the second wireless communication channel based at least in part upon the transmission information. The receiver is further configured to receive data from at least one of the one or more packets from the second access point on the second wireless communication channel.

Another aspect of the present disclosure provides another wireless station configured to communicate in a wireless communication network. The wireless station includes means for receiving transmission information from a first access point on a first wireless communication channel, the transmission information comprising information for the wireless station to communicate with the first access point on the first wireless communication channel and a second access point on a second wireless communication channel different from the first wireless channel. The wireless station further includes means for determining that one or more packets were not received from the first access point. The wireless station further includes means for determining, based at least in part upon the one or more packets not being received, a time to switch from the first wireless communication channel to the second wireless communication channel based at least in part upon the transmission information. The wireless station further includes means for receiving data from at least one of the one or more packets from the second access point on the second wireless communication channel.

In yet another aspect, the present disclosure provides a non-transitory computer-readable medium comprising code that, when executed, performs a method of communicating in a wireless communication network. The method includes receiving, by a wireless station, on a first wireless communication channel, transmission information from a first access point, the transmission information comprising information for the wireless station to communicate with the first access point on the first wireless communication channel and a second access point on a second wireless communication channel different from the first wireless channel. The method further includes determining, by the wireless station, that one or more packets were not received from the first access point. The method further includes determining, by the wireless station, based at least in part upon the one or more packets not being received, a time to switch from the first wireless communication channel to the second wireless communication channel based at least in part upon the transmission information. The method further includes receiving, by the wireless station, data from at least one of the one or more packets from the second access point on the second wireless communication channel.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 15A is a table providing exemplary values for a frame type field, in accordance with an embodiment.

FIG. 15B is a table providing exemplary values for a message type field, in accordance with an embodiment.

Figure 1:
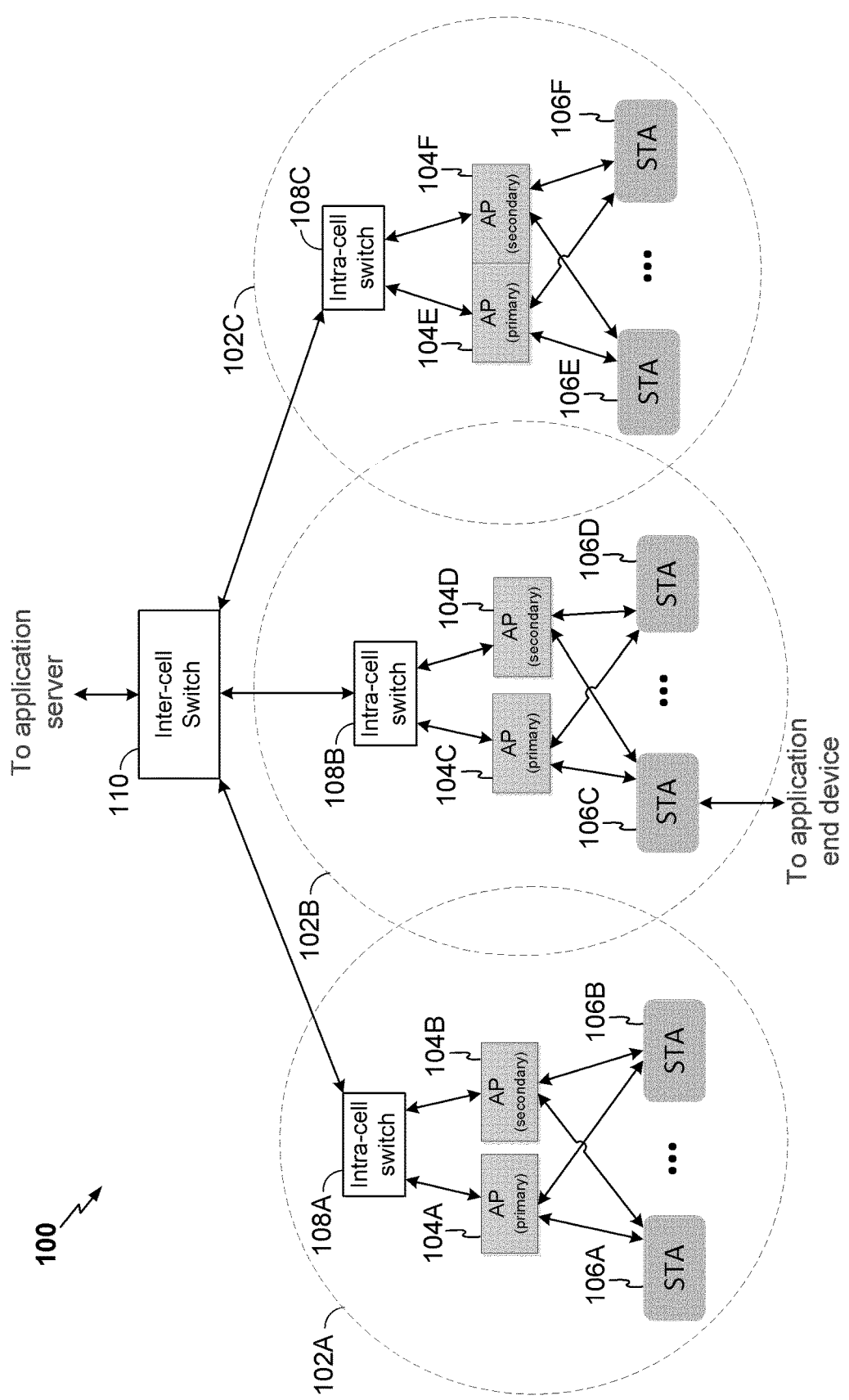
FIG. 1 is a functional block diagram illustrating a low-latency wireless local area network (WLAN) deployment, in accordance with an embodiment.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

As used herein, the term "frame" encompasses a wide variety of actions. For example, "frame" may also be referred to as a MAC-layer frame, a frame, an uplink frame, a downlink frame, a data packet, a communication, a message, and the like. As used herein, frame may refer to a collection of bits containing information indicative of instruction and identifiers that are communicated between the various components of a WLAN. A frame may be formed on top of or in addition to other frames formatted in accordance with IEEE 802.11.

The techniques described herein may be used for various WLANs such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

The disclosed techniques may also be applicable to technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. It should be noted here that different terminologies apply to different technologies when applicable.

In the last two decades great strides have been made in the development of wireless connectivity technologies, with much of the effort focusing on pushing the limit of throughput or power consumption. Another performance metric, namely latency, has not received much attention until recently, driven by rising interests and demands in new robotics and industrial automation applications. For some of these applications, wireless connectivity can be a critical technology enabler. In various applications, wireless connectivity can offer significant cost savings over existing wired solutions.

Robotics and industrial automation applications typically have very stringent requirements on reliability and latency requirements. For example, a number of such applications may require sub-millisecond round-trip delay between control server and sensors, and no more than one failure in connectivity in one hour. Such performance requirements pose a great challenge for existing wireless technologies. For example, sub-millisecond latency may implicitly require high throughput—if a payload size is 100 B, then a round-trip transmission time of 1 ms requires at least (excluding headers) 1.6 Mbps throughput, which may rule out technologies such as IEEE 802.15.4 (a.k.a. WirelessHart) and Bluetooth.

Wi-Fi (e.g., various IEEE 802.11 standards) may have high data rates, but it has several drawbacks that would prevent its use for ultra-low latency applications. For instance, Wi-Fi can have long channel access delay. Because Wi-Fi operates in an unlicensed band and networks deployed by different administers may operate in the same channel, every Wi-Fi device (referred as a wireless station (STA)) has to share channel in a fair manner. This may be achieved by using a random channel access protocol. For example, before a STA transmits, the STA may have to listen (e.g., monitor) for any active transmission and may proceed with its transmission only if the channel is idle for a period of time. After that, the STA may also have to wait a random amount of time before transmitting, in order to avoid collision with other STAs trying to access the channel at the same time. If the STA's transmission collides with other STAs, it may have to double its wait time before trying again. As a result, the more STAs that share a channel, the more likely they will collide, and the longer channel access delay may be.

The present disclosure describes various aspects for providing a WLAN that supports low-latency applications, namely, those utilizing more than one channel. In an aspect, a network that supports low-latency applications may have a goal of providing wireless communications with a round-trip time of, for example, less than 2 milliseconds. For comparison, a Wi-Fi network with a single wireless station may have a round-trip time of at least 1.5 milliseconds. As the number of Wi-Fi stations grows, the number of collisions may grow quickly and further increase the round-trip time. For simplicity, a WLAN or network that supports low-latency applications may be referred to as a low-latency WLAN or a low-latency network, respectively.

Aspects of the present disclosure for providing a low-latency WLAN may include multiple systems and methods, which can be used to reduce or minimize latency associated with wireless communications. In one aspect, the embodiments according to the disclosure herein may reuse certain aspects of Wi-Fi. For example, a PHY layer design of Wi-Fi may be used to take advantage of the high data rate, such as in the 2.4 GHz and 5 GHz ISM bands. A non-limiting advantage of utilizing the PHY layer design is that it allows a WLAN according to the present disclosure to be developed on top of commercial Wi-Fi hardware, which can allow for faster and more flexible development. Another aspect is that the WLAN according to the present disclosure replace CSMA/CA protocol of Wi-Fi networks with a polling-based MAC-layer protocol to achieve much lower channel access latency. For example, a polling protocol, in accordance with various aspects, may have an access point (AP) schedule all transmissions across a wireless communication network, which may avoid long channel access delay suffered by CSMA/CA protocol. One non-limiting advantage of the polling-based MAC-layer protocol is that it may enable many features used to reduce or minimize latency associated with wireless communications. For example, the polling protocols and methods disclosed herein may enable a dynamic polling list, improved management of power save mode (PSM), low-latency handoff of a STA from a serving AP to a target AP, and enable fair and efficient co-existence between the WLAN according to the present disclosure and Wi-Fi networks sharing the same channel.

FIG. 1 is a functional block diagram illustrating a low-latency wireless local area network (WLAN) 100 deployment, in accordance with an embodiment. As illustrated, the WLAN 100 may include one or more APs 104A-F (referred to herein individually as AP 104 or collectively as APs 104) and one or more STAs 106A-F (referred to herein individually as STA 106 or collectively as STAs 106) associated with a respective AP 104. The APs 104 are generally fixed terminals that provide backhaul services to the STAs 106. In some applications, however, the AP may be a mobile or non-fixed terminal. The STAs 106 can be fixed, non-fixed, or mobile terminals that utilize the backhaul services of their respective AP(s) 104 to connect to a network, such as the Internet. The STAs 106 may also communicate between themselves and/or with a control station, which may be connected to one or more APs 104 via a backhaul (e.g., Ethernet).

A STA 106 may also be referred to as a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, user equipment (UE), or some other suitable terminology. An AP may also be referred to as: a base station, a base transceiver station, a radio base station, a radio transceiver, a transceiver function, or any other suitable terminology. The various concepts described throughout this disclosure are intended to apply to any suitable wireless apparatus regardless of its specific nomenclature. Examples of STAs 106 include, but are not limited to a cellular phone, a smart phone, an industrial robot, a manufacturing control system, a sensor, a drone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or a wireless apparatus that utilizes the central communication coordination and/or backhaul services of an AP 104.

As illustrated, each of the APs 104 may comprise a connection to an intra-cell switch 108 (illustrated as intra-cell switches 108A-C connected to two APs 104 each). As also illustrated, each intra-cell switch 108 may be connected to an inter-cell switch 110. In some aspects, the intra-cell switches 108 or the inter-cell switch 110 may be utilized to connect the APs 104 to each other, so that the APs 104 can communicate with each other or another network (e.g., backhaul). The connection from the APs 104 to their respective intra-cell switches 108, and the connection from the intra-cell switches 108 to the inter-cell switch 110 can be wired, as opposed to wireless, which may provide for increased speed or decreased latency. The inter-cell switch 110 may comprise a connection to an application server, which may contain information or software for use to provide a service to a STA 106. Further, one or more of the STAs 106 can comprise a connection to an application end device. In various embodiments, one or more of the STAs 106 can comprise an electronic device configured to run application software. The application software may require information from the application server to function properly, or may otherwise need to transmit information to the application server. Accordingly, the APs 104 can be configured to send frames to their respective STAs 106 and receive frames from their respective STAs 106 to communicate data and/or control information (e.g., signaling). In an aspect, a STA 106 may execute a low-latency application that may benefit from network communications with low round-trip times. For example, a low-latency application may include a remote control application, a coordination application, or another application involving time-sensitive information.

In the illustrated example, there are three sets of APs 104 deployed. Each set of APs 104 (also referred to herein as "peer APs 104"), for example, APs 104A and 104B, may be located in the same wireless communication cell 102 (illustrated as cells 102A-C). In some aspects, APs 104 within the same wireless communication cell 102 can provide coverage over an area referred to as a basic service area (BSA). Peer APs 104 may follow the same protocols but operate on different channels to provide extra reliability for STAs 106 against interference. Peer APs 104 in the same wireless communication cell 102 may be connected by an intra-cell switch 108. In some embodiments, peer APs 104 and their intra-cell switch 108 can be collocated inside the same host, instead of being physically separate devices. APs 104 in different cells can be connected by an inter-cell switch 110 (e.g., an Ethernet switch), and there may not be any over-the-air (OTA) communication between them.

As illustrated, one or more of the cells 102 may provide overlapping coverage. STAs 106 that are associated with or otherwise in communication with one or more of the APs 104 may be considered part of a basic service set (BSS). For example, as illustrated, STA 106A through STA 106B may be associated with AP 104A and/or AP 104B. Thus, STAs 106A-B may be considered part of the BSS of cell 102A serviced by AP 104A and/or AP 104B. STAs 106C-D may similarly be part of a BSS of cell 102B serviced by AP 104C and AP 104D, and STAs 106E-F may similarly be part of a BSS of cell 102C serviced by AP 104E and AP 104F. The number of cells 102, APs 104, and STAs 106, and the coverage areas of the APs 104 described in connection with the WLAN 100 of FIG. 1 are provided by way of illustration and not of limitation. More or less cells 102, APs 104 or STAs 106 may be utilized, in accordance with the low-latency protocols described herein.

APs 104 can establish a communication link with a STA 106 that is within the cell 102 of the AP 104. These communication links can comprise communications channels that can enable uplink (UL) or downlink (DL) communications or messages. When a STA 106 has been handed over to a serving AP 104, the STA 106 may become associated with the serving AP 104. Once associated, a communication link can be established between the AP 104 and the STA 106 such that the AP 104 and the associated STA 106 can exchange frames or messages through direct communications channel. The communication channel for each AP 104 may be shared among any STAs 106 associated with the AP 104. Neighbor APs 104 that have overlapping coverage area with an AP 104 may be configured to use different channels. For example, each of APs 104A-D may each use a different channel. Additionally or alternatively, APs 104 of neighboring cells 102 may reuse frequencies to minimize co-channel interference. In an aspect where a low-latency WLAN 100 includes additional APs 104 that do not have overlapping coverage areas, the additional AP 104 may reuse a channel of an AP 104 of the low-latency WLAN 100.

Figure 2:
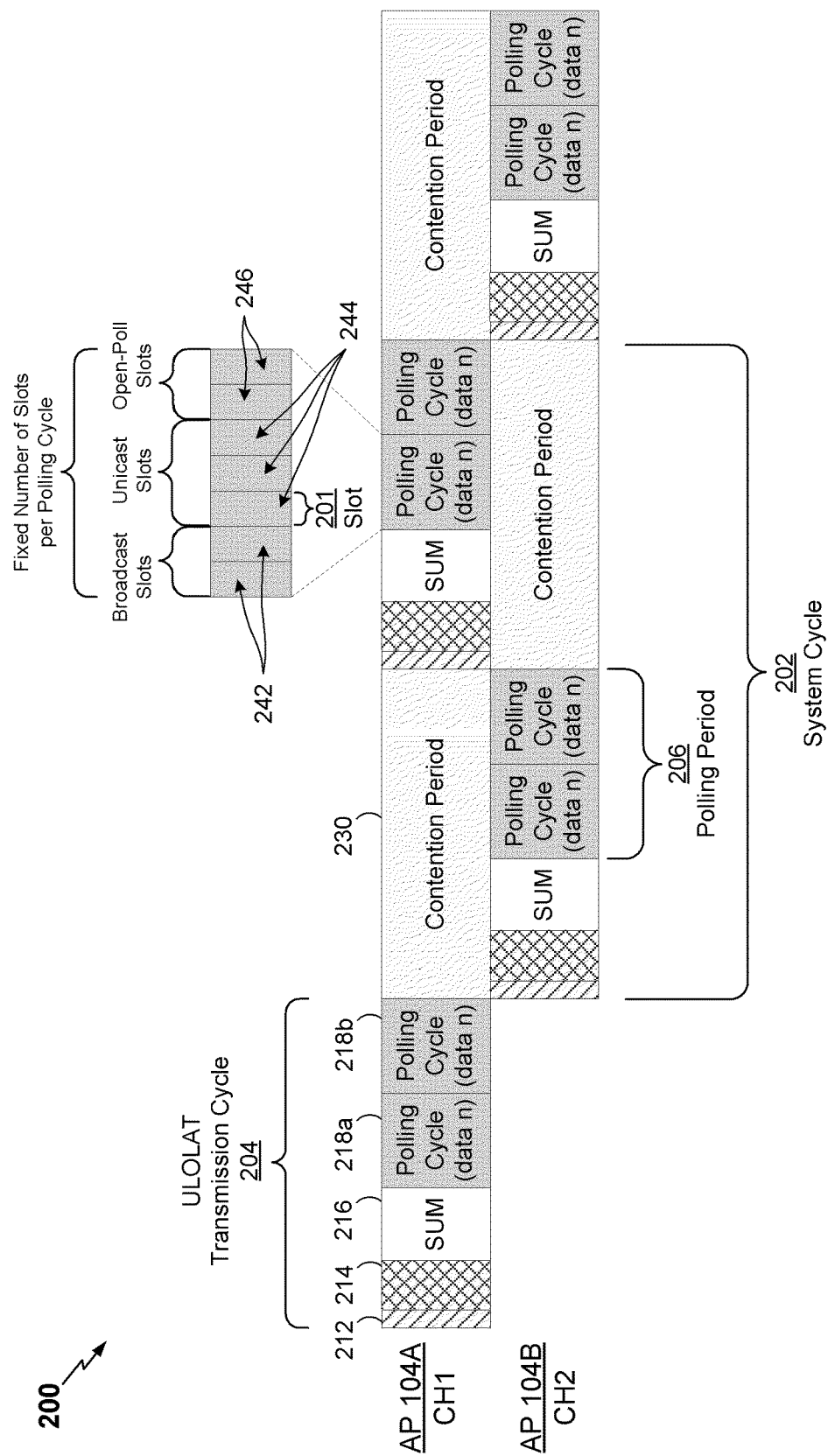
FIG. 2 shows a timing diagram illustrating exemplary frames transmitted in accordance with a multiple channel protocol, in accordance with an embodiment.

Each STA 106 may communicate with or receive service from one or more of the APs 104 in the cell 102, in accordance with one or more of the low-latency protocols described herein. In some aspects, one or more of the APs 104 may provide service or otherwise communicate with one or more of the STAs 106 on more than one wireless communication channel. For example, FIG. 2 shows a timing diagram 200 illustrating exemplary frames transmitted in accordance with a multiple channel protocol, in accordance with an embodiment. As illustrated, transmission may occur on two separate wireless communication channels CH1 and CH2. In one aspects, CH1 and CH2 may correspond to two channels utilized by peer APs 104A and 104B, respectively. These transmissions may comprise frames transmitted in accordance with a low-latency protocol (also referred to herein as "ultra-low latency (ULOLAT)" protocol).

In one aspect, there may be two types of STAs 106 within the ULOLAT protocol: a bi-directional STA 106 (also referred to herein as a Type-A STA 106) and a listen-only STA 106 (also referred to herein as a Type-B STA 106). A bi-directional STA 106 can be configured to both send and receive data traffic. These bi-directional STAs 106 may request a unicast slot from an AP 104 so that the STA 106 may be polled during a system cycle (as described in below with reference to FIG. 2). Polling during a unicast slot or unicast transaction permits the STA 106 to send data, for example, using an UL transmission. A listen-only STA 106 may only listen on the DL for data transmission, and may not be configured to transmit on an UL. Listen-only STAs 106 may, however, still send an authentication message(s) to an AP 104 when initially joining the wireless communication network 100, but may not be assigned a unicast slot. Otherwise, listen-only STAs 106 may generally only receive a broadcast or multicast message(s). A multicast message may be similar to a broadcast message, but can be restricted to only one STA 106 or a group of STAs 106, instead of all STAs 106 in the network.

One or more of the STAs 106 may be implemented with a protocol stack. The protocol stack can include a physical layer for transmitting and receiving data in accordance with the physical and electrical specifications of the wireless channel, a media access control (MAC) layer for managing access to the wireless channel, a network layer for managing source to destination data transfer, a transport layer for managing transparent transfer of data between end users, and any other layers necessary or desirable for establishing or supporting a connection to a network.

Each AP 104A and 104B may run the same MAC-layer protocol, but while operating on their respective, different wireless communication channels CH1 and CH2. On each wireless communication channel CH1 and CH2, all transmissions (e.g., both DL and UL) are scheduled via a polling schedule by an AP 104, and are organized in units of system cycles 202 and slots 201. Each system cycle 202 can consists of a ULOLAT transmission cycle 204 and a contention period 230. As illustrated, the ULOLAT transmission cycle 204 may comprise four phases, including a clear channel assessment (CCA) phase 212, a guard interval (GI) 214, a system update message (SUM) phase 216, and a polling period 206. In some aspects, an AP 104 may determine the system cycles 202, as described herein, in accordance with a polling schedule.

During the CCA phase 212, before the AP 104A starts a system cycle 202, it performs CCA to ensure the wireless communication channel CH1 is available for transmission. Once the result of CCA procedure indicates the channel CH1 is clear, ULOLAT AP 104A and/or STAs 106 (e.g., STAs 106A-B) then continuously occupy the channel CH1 until they complete the polling period phase 206. Otherwise, AP 104A can keep repeating the CCA procedure until the channel CH1 becomes available. The duration of each CCA can be compliant with local or other regulations. In some aspect, ETSI's specification may be followed (e.g., ETSI EN 301 893 V1.7.1; Broadband Radio Access Networks; 5 GHz High Performance RLAN; Harmonized EN covering the essential requirements of article 3.2 of the R&TTE, 2012).

If the time spent by AP 104A in performing CCA is longer than a maximum channel switching time for STAs 106 (user configurable), then the GI 214 may not be required. Otherwise, during the GI 214, there can be a GI with a length such that the combined duration of CCA phase 212 and the GI 214 is equal to or longer than the maximum channel switching time. Whenever the GI 214 is of length greater than a distributed inter frame space (DIFS), the AP 104A can send filler frames to keep the channel CH1 occupied.

As part of the SUM phase 216, the AP 104A may transmit a SUM that contains basic information about a cell 102, information needed by STAs 106 for handoff, or information useable to conduct other operations. In some aspects, the SUM is transmitted $N_{SUM}$ times to achieve high reliability. SUM may be transmitted according to the frame format of the SUM 500 of FIG. 5.

During the polling period phase 206, $N_{polling\_cycle}$ consecutive polling cycles may occur. For example, as illustrated, the polling period phase 206 may comprise two polling cycles 218a and 218b (e.g., $N_{polling\_cycle}=2$). Each polling cycle may be of a duration ($T_{polling\_cycle}$) equal to $T_{slot} \times N_{slot}$, where $T_{slot}$ is the duration of each slot and $N_{slot}$ is the number of slots per system cycle 202. In some aspects, $T_{slot}$ may be in a unit of symbol time used in the PHY. In some aspects, $N_{slot}$ may be calculated by user as duration of system cycle 202 divided by average duration of a slot 201. Within a polling cycle 218, the AP 104A can communicate with STAs 106 in slots 201. If a system cycle 202 is configured to have more than one polling cycle 218, then each subsequent polling cycle 218 can be a repetition of the first polling cycle 218a. In some aspects, transmitting multiple repeated polling cycles 218 may increase reliability. Each polling cycle 218 can have a fixed number of slots 201 ($N_{slot}$).

Each slot 201 may be utilized for different types of messages. For example, as illustrated, each polling cycle 218 may comprise one or more broadcast slots 242, one of more unicast slots 244, and one or more open-poll slots 246. Each slot 201 can have the same duration ($T_{slot}$), which may be user configurable. In some aspects, the duration of a slot 201 may be based on one or more of: a transmission rate, whether the transmission rate is fixed, whether the transmission rate is the same for all STAs 106, an expected payload size, a number of repetitions in a broadcast slot 242, a transmission time of a broadcast frame, a worst-case duration of a unicast slot 244, or a worst-case duration of an open-poll slot 246.

A broadcast slot 242 may be utilized to transmit information to a group of STAs 106 (e.g., Type-A or Type-B STAs 106). In some aspects, a broadcast frame transmitted in a broadcast slot may be similar to the downlink (DL) message 600 of FIG. 6. A destination address of the broadcast frame may be set to a broadcast/multicast address defined in an 802.11 specification. The address and membership for different broadcast groups can be preconfigured by users, and may be known to all STAs 106.

The first $N_{bcast}$ slots in a polling cycle 218 can be dedicated to broadcast groups. Each broadcast group may be assigned to a particular broadcast slot 242. When sending a broadcast frame, the AP 104A can repeat the transmission of the broadcast frame $N_{bcast\_rep}$ times, which may be separated from each other by a short interframe space (SIFS). In some aspects, a broadcast slot 242 may not require an acknowledgment (ACK) frame. In some aspects, the broadcast frames can be padded so that the slot 201 is fully occupied by their transmissions, aside from at least the SIFS gap between them. When there is no active broadcast transmission, the AP 104A can send filler frames, such as the filler frame 720 of FIG. 8 in those broadcast slots 242 to keep the channel CH1 occupied.

A unicast slot 244 may be utilized to communicate with STAs 106 (e.g., Type-A STAs 106). A unicast slot 244 may start with the AP 104A sending a DL message, which may be similar to the DL message 600 of FIG. 6, to a specific STA 106. The DL message may be followed by an UL reply from the STA 106, which may be similar to the UL message 700 of FIG. 7. In some aspects, no other STAs 106 may be scheduled to transmit to the AP 104A in this slot 201. In some aspects, only Type-A STAs 106 may have unicast slots 244 assigned to them, as Type-B STAs 106 may generally only listen for broadcast messages. Such a design can allow a system to support a larger number of Type-B STAs 106 than Type-A STAs 106.

Layer-two ACK (e.g., a hardware ACK) may be enabled for unicast transmission on both DL and UL. These ACKs may be transmitted using the DL message 600 of FIG. 6 or the UL message 700 of FIG. 7, and in some aspects may be transmitted without a payload. Transmission of these ACKs may help increase the reliability of transmission, and may also help to avoid long time gaps between frames that may give Wi-Fi devices opportunity to capture the channel (e.g., when there is a transmission error). When a unicast slot 244 is not assigned to a STA 106, the AP 104A can transmit filler frames in that slot 201 to keep the channel CH1 occupied. The procedure for communication during a unicast slot 244 is described in further detail below with respect to FIG. 10.

An open-poll slot 246 may be utilized to by the AP 104A to allow STAs 106 (both Type-A and Type-B) to join the wireless communication network 100 on-demand. An open-poll slot 246 can start with the AP 104A broadcasting an open poll frame, which may be transmitted in a format similar to the DL message 600 of FIG. 6. In some aspects, the open-poll frame may not have a payload. The procedure for communication during an open-poll slot 246 and other processes that occur as a result of these communications are described in further detail below with respect to FIGS. 11-13.

Each polling cycle 218 can have a fixed number of broadcast slots 242 and open-poll slots 246, and the remaining slots 201 in the polling cycle 218 can be assigned as unicast slots 244. In a polling cycle 218, each broadcast stream and each Type-A STA 106 may only be served once by the AP 104A, but may be served again in subsequent polling cycles 218. In some aspect, different data may be served in subsequent system cycle 202. Therefore, a system cycle 202 may relate to how often the AP 104A serves a broadcast stream or communicates with a STA 106.

During a polling period phase 206, a ULOLAT system (e.g., ULOLAT devices) may fully occupy the channel CH1. For example, the AP 104A can transmit and receives in slots 201 continuously without any gap between them. Accordingly, in some aspects, neither the AP 104A nor any STA 106 may need to perform CCA before transmitting during a polling period 206. This measure may prevent Wi-Fi devices (e.g., non-ULOLAT devices) from capturing the channel CH1 in the middle of ULOLAT's transmission cycle. The duration of a polling period phase 206 $T_{polling\_period}$) may be equal to the number of polling cycles 218 ($N_{polling\_cycle}$) times the duration of a polling cycle 218 ($T_{polling\_cycle}$).

During the contention period 230, ULOLAT devices (both APs 104 and STAs 106) stay silent to give other devices (e.g. Wi-Fi) opportunity to use the channel CH1. The default duration of a contention period 230 ($T_{contention}$) may be user configurable and can be equal to or longer than the total duration of the CCA phase 212, the GI phase, the SUM phase 216, and the polling period phase 206 combined. In some aspects, utilizing a contention period 230 of this length may avoid having polling periods 206 on different channels that overlap in time. The actual duration of a contention period 230, however, may be shorter than a default length if the CCA phase 212 continues beyond a default start time of the polling period 206. The duration of a system cycle 202 ($T_{system\_cycle}$) may be equal to the sum of a duration of the CCA phase 212, the duration of the GI 214, a transmission time of SUM (e.g., duration of the SUM phase 216), $T_{polling\_period}$, and $T_{contention}$.

Although the descriptions above are generally described with reference to the AP 104A on the first wireless communication channel CH1, the same procedures may be repeated by the AP 104B, but on the second wireless communication channel CH2. For example, in some aspects, the scheduled transmissions during the ULOLAT transmission cycle 204 by the AP 104A on the first wireless communication channel CH1 may be repeated by the AP 104B on the second wireless communication channel CH2. These repeated transmission by the AP 104B may occur during a time in which the AP 104A is in a contention period 230. In some aspects, the beginning of the system cycle 202 on the second wireless communication channel CH2 may start at an offset in time from the start of corresponding system cycle 202 on the first wireless communication channel CH1. In some aspects, a time duration of the system cycle 202 or polling cycle 218 for the AP 104B is the same or equivalent to a time duration of the system cycle 202 or polling cycle 218 for the AP 104A. In some aspects, the time duration of the system cycle 202 or polling cycle 218 for the AP 104B is the same or equivalent to the time duration of the system cycle 202 or polling cycle 218 for the AP 104A except that the time duration of the system cycle 202 or polling cycle 218 for the AP 104A is offset in time relative to the time duration of the system cycle 202 or polling cycle 218 for the AP 104B as is illustrated in FIG. 2. In some aspects, a frame structure of the system cycle 202 or polling cycle 218 for the AP 104B is the same or equivalent to a frame structure of the system cycle 202 or polling cycle 218 for the AP 104A as is illustrated in FIG. 2. Additional details on this procedure are provided below with respect to FIG. 14B.

Additionally, although generally only two APs 104 and two wireless communication channels are described above with one AP 104 per channel, a ULOLAT system may comprise any number of APs and wireless communication channels, and more than one AP 104 may be communicating on the same wireless communication channel. In an aspect, the ULOLAT system may comprise a plurality of APs 104 each operating on one of a plurality of wireless communication channels.

Figure 3:
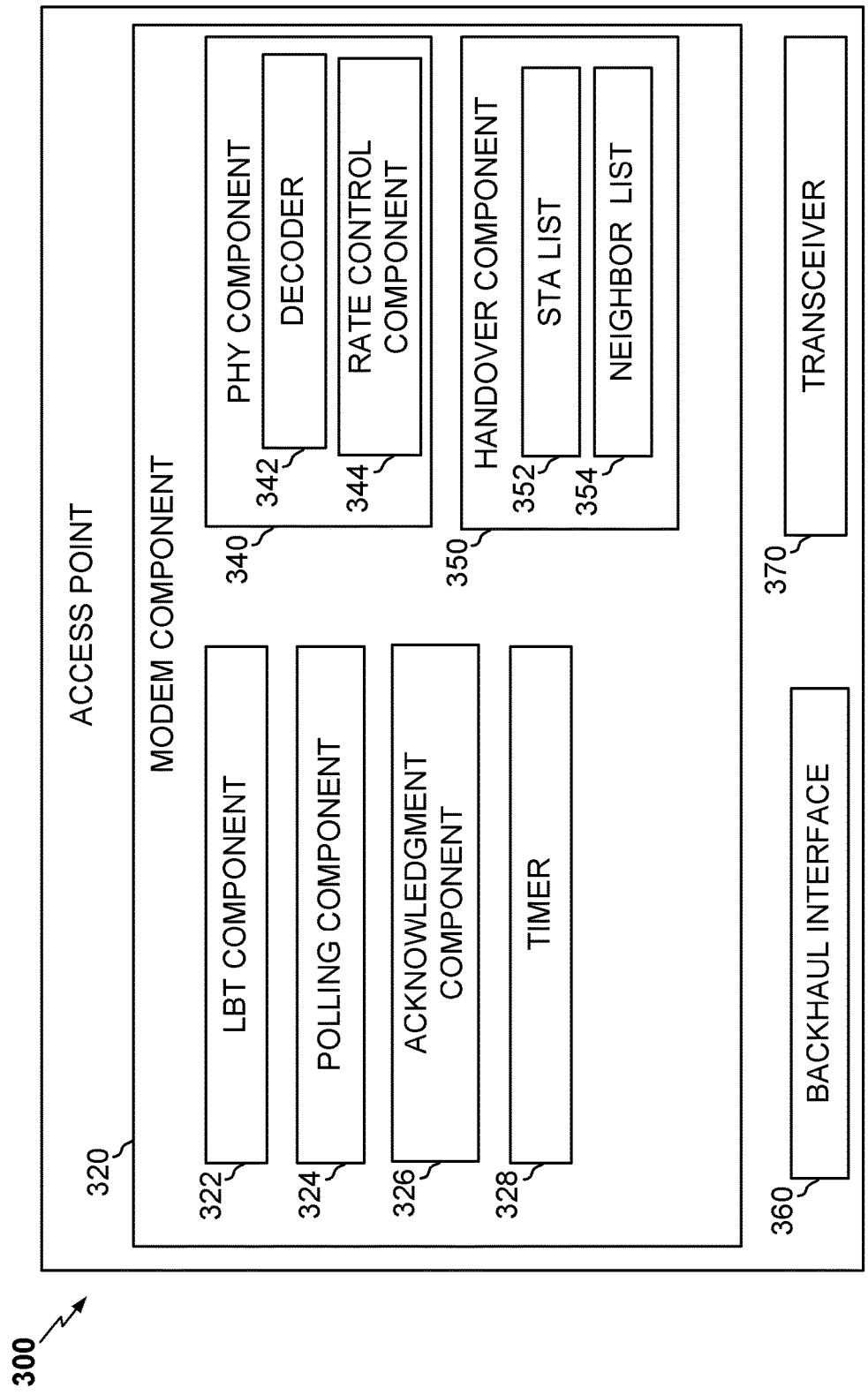
FIG. 3 is a functional block diagram illustrating an example access point, in accordance with an embodiment.

FIG. 3 is a functional block diagram illustrating an example AP 300, in accordance with an embodiment. The AP 300 may be an example of a serving AP 104 and may include a modem component 320 for generating or processing electronic communications, a backhaul interface 360 for communicating with a backhaul network, and a transceiver 370 for communicating with STAs 106.

The modem component 320 may be configured to provide for DL and UL transmissions within the channel structure of FIG. 2. As illustrated, the modem component 320, may include a listen-before-talk (LBT) component 322 for determining whether a wireless channel is available, a polling component 324 for indicating whether a STA 106 may transmit in the UL direction, an acknowledgment component 326 for acknowledging UL transmissions, and a timer 328 for determining whether a duration of an UL transmission has expired. The modem component 320 may further comprise a physical (PHY) layer component 340 and a handover component 350.

The LBT component 322 may be configured to determine whether a wireless channel, such as one of the wireless communication channels CH1 or CH2 of FIG. 2, is free by using, for example, CCA or other channel sensing mechanism. In an aspect, for example, the LBT component 322 may listen to the wireless channel for a configured time period to see if any other devices are transmitting on the wireless channel. If the channel is busy, the LBT component 322 may determine a back-off time period to wait before starting a transmission.

The polling component 324 may be configured to select a STA 106 for polling to initiate an UL transmission. The polling component 324 may determine polling based on latency and throughput needs of the low-latency network (e.g., wireless communication network 100 of FIG. 1). For example, in an aspect, the polling component 324 may use a round-robin approach to periodically poll each STA 106. In another aspect, each STA 106 may be assigned a priority (e.g., based on traffic duty cycle or delay budget) and be polled according to the priority. The polling component 324 may also determine polling based on DL traffic load. For example, the polling component 324 may determine that a DL transmission may be sent without polling information when there is a need to quickly send DL data. In another aspect, the polling component 324 may predict a type of UL data to be transmitted by a STA 106. For example, the polling component 324 may determine whether a STA 106 is likely to transmit low-latency data or regular data, or determine whether the UL data is likely to be a management or control message. The prediction may be based on, for example, an UL transmission pattern associated with the STA 106 and/or an indication (e.g. a more-data field) in a previous UL transmission. The polling component 324 may indicate polling by setting fields of a header for a DL frame to create a message, for example a broadcast message, a unicast polling message, or open poll message. For example, the polling component 324 may set a frame type field or a frame control field of a message to a particular value. In an aspect, the polling component 324 may designate one or more slots (e.g., slot 201 of FIG. 2) for a given STA based on a received frame from the STA (e.g., during a joining procedure).

The acknowledgment component 326 may be configured to transmit an acknowledgment when an UL transmission is successfully received. The acknowledgment component 326 may generate a DL frame to acknowledge the UL transmission. The acknowledgment component 326 may also transmit a negative ACK (NACK) when an UL transmission is incorrectly received. In another aspect, the acknowledgment component 434 may acknowledge messages by generating an ACK following the successful reception of the message.

The timer 328 may be configured to determine whether the permitted duration of an UL transmission has expired. In an aspect, for example, the timer 328 may include a memory storing a start time, stop time, and/or duration. In an aspect, the duration of the UL transmission may be variable, and may be determined by the polling component 324 and/or the rate control component 344. In an aspect, the duration for the UL transmission may be transmitted in the polling information. The duration of timer 328 may be configured to be the same, or slightly longer than the permitted duration for the UL transmission of a given scheduled slot window. When the timer 328 expires, the timer 328 may trigger the polling component 324 to select a new STA 106 to poll or another DL frame (e.g., a subsequent broadcast or open poll frame).

The PHY layer component 340 may handle physical layer transmission properties such as modulation rate and decoding. In an aspect, the PHY layer component 340 may include a decoder 342 and a rate control component 344. The decoder 342 may receive a signal from the transceiver 370 and determine a MAC PDU. In an aspect, the decoder 342 may be a soft-decision Viterbi decoder that may be configured to provide a likelihood ratio for a most likely decoding path and also for one or more alternative decoding paths. The decoder 342 may also estimate a signal-to-noise ratio (SNR) for a received transmission. The decoder 342 may also estimate a received signal strength indicator (RSSI) based on received frames, as well as a reference signal received power (RSRP), reference signal received quality (RSRQ), and/or signal-to-interference-plus-noise ratio (SINR).

The rate control component 344 may determine a modulation and coding scheme (MCS) to use for transmissions. In an aspect, the rate control component 344 may be in communication with a rate control component 460 (FIG. 4) at each STA 106 and signal an MCS and/or receive a signaled MCS. For example, the rate control component 344 may receive signaling indicating a channel quality or requested MCS. The rate control component 344 may also determine an MCS based on a frame error rate target and a channel condition such as SNR.

The handover component 350 may be configured to manage a handoff between the AP 300 and a neighbor AP 104. The handover component 350 may communicate with associated STAs 106 using in-band messages. For example, the handover component 350 may provide handoff signaling as DL data for the polling component 324 to schedule. The handover component 350 may include an STA list 352 for storing information regarding each of the STAs 106 associated with the AP 300. For example, the STA list 352 may receive channel quality measurements from each STA 106. The handover component 350 may add a STA 106 to the STA list 352 when an STA 106 is handed over to the AP 300 and remove an STA 106 when the AP 300 hands over the STA 106 to a neighbor AP 104. The handover component 350 may also include a neighbor list 354 for storing information regarding each neighbor AP 104. For example, the neighbor list 354 may include properties of the neighbor APs 104 such as channels, timing, or other information an STA 106 may use to connect to the neighbor AP 104. The handover component 350 may also be electronically coupled to the backhaul interface 360 in order to send and receive various messages with the neighbor APs 104. For example, the handover component 350 may use the backhaul interface 360 to send a transfer request identifying an STA 106 the AP 300 would like to handover and receive a transfer response indicating whether the neighbor AP 104 has accepted a handover of the STA 106. The backhaul interface 360 may also be utilized to transmit a handover update message indicating that a STA 106 has acknowledged a handover command and should now be associated with the neighbor AP 104.

Figure 4:
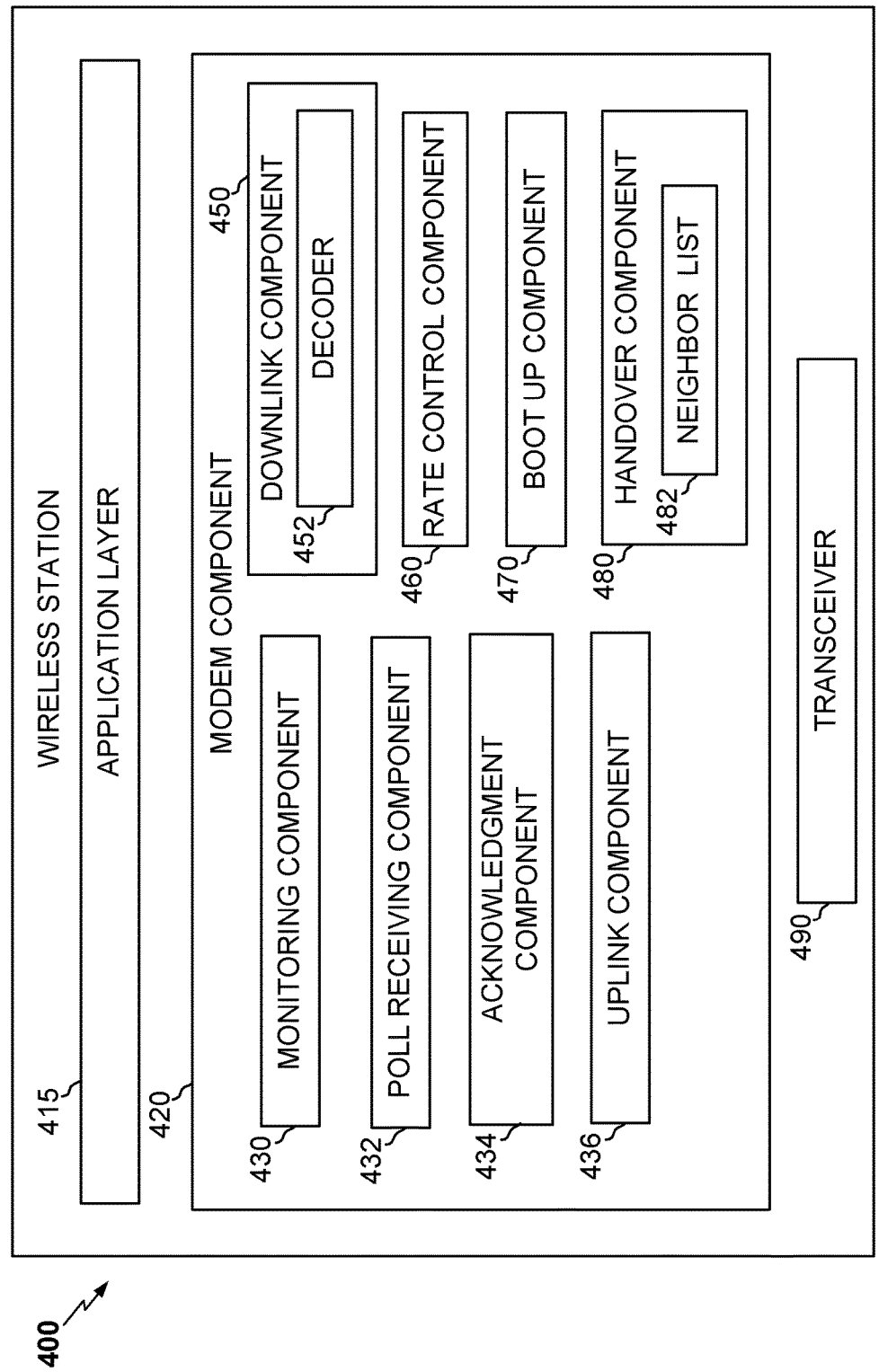
FIG. 4 is a functional block diagram illustrating an example wireless station, in accordance with an embodiment.

FIG. 4 is a functional block diagram illustrating an example wireless station (STA) 400, in accordance with an embodiment. The STA 400 may be an example of a STA 106 of FIG. 1. The STA 400 may include an application layer 415 that may run a low-latency application, a modem component 420 for managing MAC layer processing of wireless communications, and a transceiver 490 for wirelessly transmitting and receiving signals.

The application layer 415 may include hardware and/or software executable by a processor for running one or more applications. In an aspect, the application may be a low-latency application requiring low-latency communications. For example, the application may be a control application for a robot or drone. The application layer 415 may include or be running on a host processor and communicate with the modem component 420 via a modem driver. In an aspect, the application layer 415 may be configured to minimize latency of communications. In an aspect, for example, the application layer 415 may configure the modem driver to disable interrupt mitigation and frame aggregation. That is, when the application layer 415 has data for transmission, the application layer 415 may immediately forward the data to the modem component 420 without waiting for additional data to aggregate with the data for transmission. The application layer 415 may also receive interrupts from the modem component 420 when each frame is received rather than waiting for aggregation with additional frames. As another example, the application layer 415 may use a raw socket with the modem component 420. The application layer 415 may directly generate MAC layer frames (e.g., a MAC service data unit (SDU)) within the application rather than using multi-layer encapsulation to generate MAC layer frames. The application layer 415 may also keep a processor running in performance mode rather than switching to a low-power mode. In an aspect, the application layer 415 may set the modem component 420 to a promiscuous mode to forward all received traffic to the application layer 415 regardless of whether the received traffic is for the STA 400. A constant stream of traffic may prevent the processor from entering a low-power mode even when the application traffic has a low duty cycle. In another aspect, the application layer 415 may use a non-infrastructure mode. The non-infrastructure mode may remove beacons and other unnecessary overhead. The non-infrastructure mode may also allow the STA 400 to receive frames from an AP 104 that is not associated with the STA 400. For example, the modem component 420 may provide received frames to the application layer 415 regardless of a basic service set indicator (BSSI) included in the frame.

The modem component 420 may include hardware and/or software executable by a processor for managing MAC layer processing for wireless communications. In an aspect, the modem component 420 may provide a low-latency time-sharing multi-access MAC layer protocol for communications with an AP 104. For example, the modem component 420 may provide for communication according to the channel structure described with respect to FIG. 2. The modem component 420 may include a monitoring component 430 for determining whether a polling message has been received, a poll receiving component 432 for determining properties for an UL transmission based on a polling message, an acknowledgment component 434 for acknowledging DL transmissions, and an UL component 436 for transmitting an UL data frame. The modem component 420 may also include a DL component 450 for receiving DL transmissions, a rate control component 460 for controlling a modulation rate or MCS, a boot-up component 470 for connecting to a low-latency network, and a handover component 480 for managing mobility between APs 104.

The monitoring component 430 may be configured to determine whether a broadcast message, a unicast polling message, or an open poll message has been received. For example, this determination may be made based on information contained in the frame type field of a received packet. The monitoring component 430 may monitor a wireless channel of the serving AP 104, such as the wireless communication channel CH1 of FIG. 2. In particular, the monitoring component 430 may monitor for DL frames including a header indicating the frame type, for example, having frame type field value set to a value indicating an open poll message. In an aspect, the wireless channel may be asynchronous and the monitoring component 430 may constantly monitor the wireless channel. In another aspect, the monitoring component 430 may be able to determine a time period when a message is unlikely to be received. For example, a unicast polling message may be unlikely following a unicast polling message for another station that includes a large DL transmission or a long duration for an UL transmission. Accordingly, the monitoring component 430 may indicate that other actions may be performed before the next polling message is expected. For example, the STA 400 may perform measurements on another wireless channel to determine a signal strength of a neighbor AP 104.

The poll receiving component 432 may be configured to determine UL transmission properties based on a received unicast polling message or open poll message. In an aspect, either message may include an allowed transmission duration and/or a MCS to use for the transmission. The poll receiving component 432 may extract such UL transmission properties from the received message.

The acknowledgment component 434 may be configured to acknowledge DL frames. For example, the acknowledgment component 434 may acknowledge a received message by generating an ACK. The acknowledgment component 434 may also negatively acknowledge a received message by generating a NACK. The acknowledgment component 434 may also generate an ACK/NACK for DL frames that do not include polling information, or any other message.

The UL component 436 may be configured to manage UL transmissions of the STA 400. The UL component 436 may receive UL data from the application layer 415 and temporarily store the UL data. The UL component 436 may determine which data to transmit during a time period (e.g., slot 201) based on the duration assigned to the STA 400 in the received message and a MCS determined by the rate control component 460. The UL component 440 may provide the UL transmission data to the transceiver 490.

The DL component 450 may be configured to receive DL transmissions from an AP 104. The DL transmissions may be received in a DL frame, which may be a polling message, and open poll message, or a broadcast message. The DL component 450 may include a decoder 452. The decoder 452 may first decode a header portion of a DL frame to determine whether the DL frame for the STA 400. If a destination address of the DL frame matches the address of the STA 400, the decoder 452 may decode the DL frame for the STA 400.

The rate control component 460 may be configured to determine a modulation rate and/or a MCS for the STA 400. In an aspect, the rate control component 460 may be in communication with the rate control component 344 of the AP 300. For example, the rate control component 460 may determine a desired MCS for DL frames based on previously received DL frames and provide an MCS index to the rate control component 344. The rate control component 460 may also receive MCS information in the polling information to use for an UL transmission. The rate control component 460 may receive an MCS in the header of a DL frame to use for decoding the DL frame.

The boot-up component 470 may be configured to connect the STA 400 to an authentication AP 104 to join a low-latency network. The boot-up component 470 may perform respond an open poll message from the AP 104 by transmitting a join message in response to STA 400 receiving an open poll message on a boot-up channel to connect to the authentication AP 104. The boot-up component 470 may then perform an authentication procedure to ensure that the STA 400 is allowed to access the low-latency network. The authentication AP 104 may then hand the STA 400 over to a serving AP 104. If STA 400 ever becomes disconnected from a serving AP 104, the boot-up component 470 may reconnect to the low-latency network via the authentication AP 104. In some aspects, the authentication AP 104 may be the same as the serving AP 104. The boot-up component 470 may also be configured to switch the STA 400 into and out of power save mode (PSM), where the wireless station operates in a low-power state.

The handover component 480 may be configured to manage mobility of the STA 400 within a low-latency network. For example, the handover component 480 may communicate with handover component 350 of the AP 300 to implement a handoff process. The handover component 480 may be configured to measure the channel quality or signal strength of neighbor APs 104. The handover component 480 may determine when a handover to one of the neighbor APs 104 should occur, or the handover component 480 may report the channel quality to the current serving AP 104. In an aspect, the handover component 480 may include a dedicated transceiver (not illustrated) for performing measurements. The dedicated transceiver may be tuned to wireless channels used by neighbor APs 104 without interrupting communications between the STA 400 and the serving AP 104. For example, the handover component 480 may provide handoff signaling as UL data for the polling component 324 of the target AP 300 to schedule. The handover component 480 may determine whether to perform a hand over of the STA 400 based on the channel quality measurements. The handover component 480 may also include a neighbor list 482 for storing information regarding each neighbor AP 104. For example, the neighbor list 482 may include properties of the neighbor APs 104 such as channels, timing, or other information the STA 400 may use to connect to the neighbor AP 104. The neighbor list 482 may be received by the STA 400 in the MAC-layer header of a received SUM.

Figure 5:
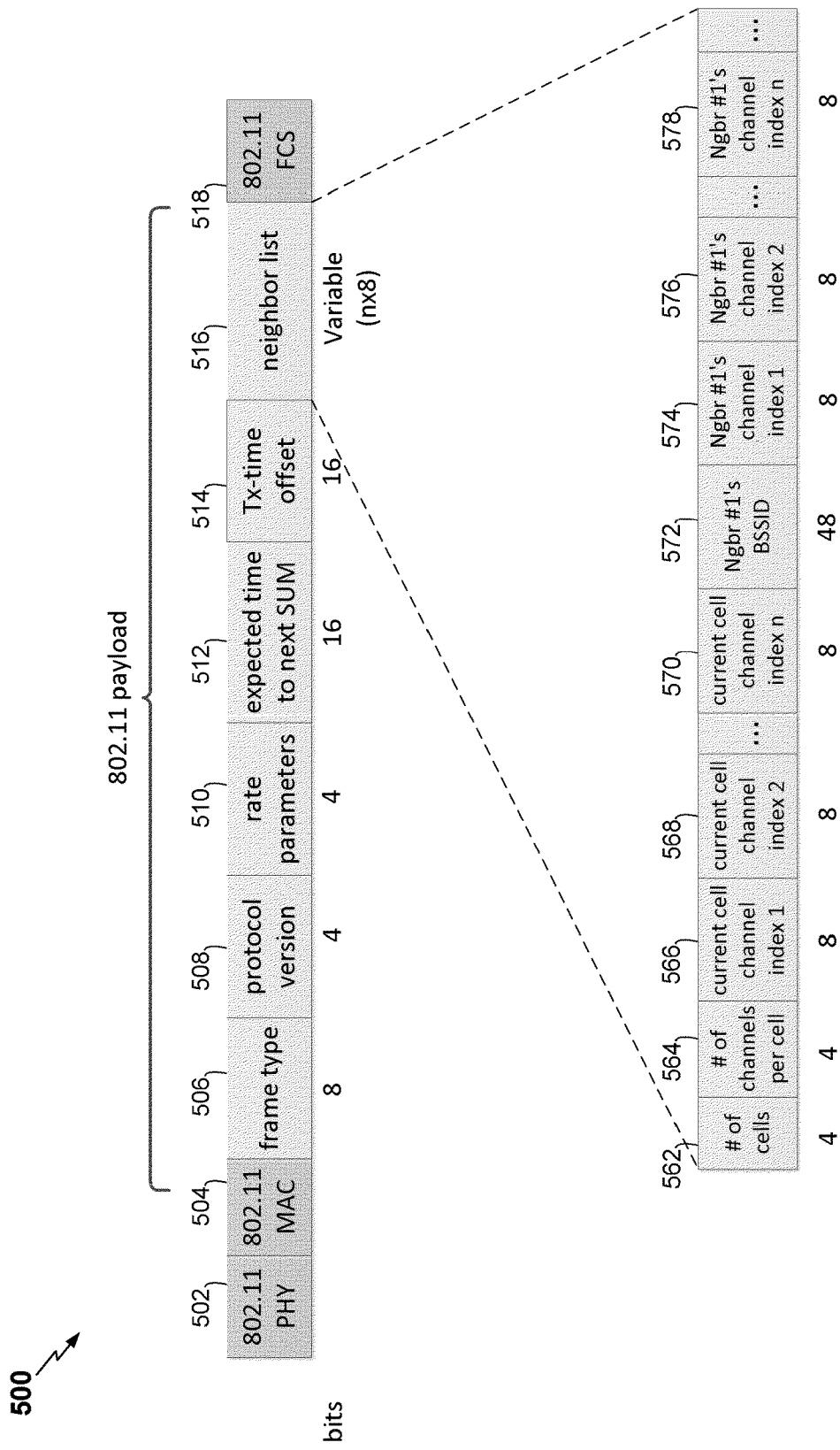
FIG. 5 is a block diagram illustrating an exemplary system update message frame format, in accordance with an embodiment.

FIG. 5 is a block diagram illustrating an exemplary SUM 500 frame format, in accordance with an embodiment. As illustrated, the SUM 500 frame format may comprise an 802.11 PHY header 502, an 802.11 MAC header 504, a frame type 506, a protocol version 508, rate parameters 510, an expected time to the next SUM 512, a transmission time offset 514, a neighbor list 516, and an 802.11 frame check sequence (FCS) 518. In various embodiments, the SUM 500 frame format does not include a payload.

The 802.11 PHY header 502 and the 802.11 MAC header 504 may be implemented in accordance with an 802.11 format, and comprise information about the transmission of the SUM 500 itself. The frame type 506 may comprise eight bits (one byte), and may indicate the frame type of the SUM 500. In some aspects, the frame type 506 may be implemented in accordance with the values listed in FIG. 15A. For example, the value of "0x03" may indicate that a message is a SUM. The protocol version 508 may comprise four bits, and may indicate the protocol run by the system. The rate parameters 510 may comprise four bits, and may indicate the MCS index used by all STAs 106 for their transmissions. In some aspects, all, or at least a portion of, the frames transmitted in accordance with the ULOLAT protocol may be transmitted at a fixed data rate indicated in the rate parameters 510. In accordance with these aspects, the data rates may not be dynamically adjusted by a rate control algorithm. In various embodiments, the MCS can be altered based on individual deployment scenarios.

The expected time to the next SUM 512 may comprise sixteen bits, and may indicate the expected time to the next SUM, in units of symbol time used in the PHY, relative to the actual start time of the current SUM 500 being transmitted. The transmission time offset 514 may comprise sixteen bits, and may indicate the difference between the actual transmission time and the default transmission time of the SUM 500 being transmitted.

As illustrated, the neighbor list 516 may comprise a variable number of bits, which may be a multiple of eight. The neighbor list 516 may comprise a variable number of entries, and may provide indices of the channels used by the current cell 102, as well as basic service set identifiers (BSSIDs) and indices of channels used in the neighboring cells 102. As illustrated, the neighbor list 516 may comprise indications of a number of cells 562, which may comprise four bits indicating the number of cells whose parameters are included in the neighbor list 516. The neighbor list 516 may further comprise a number of channels per cell 564, which may comprise four bits indicating the number of channels ($N_{channel}$) that each cell has. The neighbor list 516 may further comprise a first current channel index 566, and a second current channel index 568 through an Nth current cell channel index 570, where N may correspond to $N_{channel}$. Each of the channel indexes 566-570 may comprise eight bits indicating an index to the channels used by the current cell 102. For each neighboring cell 102, the neighbor list 516 may further comprise a forty-eight bit indication of a BSSID 572 of the neighboring cell 102, and $N_{channel}$ indices 574-578 for the neighboring cell 102. The 802.11 FCS 518 may be implemented in accordance with an 802.11 standard, and may be used by a recipient of the SUM verify whether or not any errors occurred in the frame during the transmission.

Figure 6:
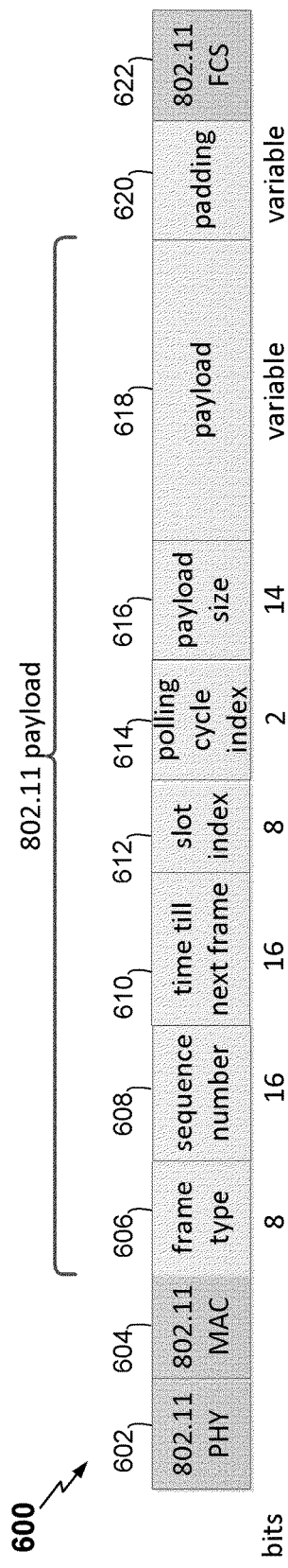
FIG. 6 is a block diagram illustrating an exemplary downlink message frame format, in accordance with an embodiment.

FIG. 6 is a block diagram illustrating an exemplary DL message 600 frame format, in accordance with an embodiment. As illustrated, the DL message 600 frame format may comprise an 802.11 PHY header 602, an 802.11 MAC header 604, a frame type 606, a sequence number 608, a time until the next frame 610, a slot index 612, a polling cycle index 614, a payload size 616, a payload 618, padding 620, and an 802.11 FCS 622. The 802.11 PHY header 602, the 802.11 MAC header 604 and the 802.11 FCS 622 may be similar to the respective portions of the SUM 500 discussed above.

The frame type 606 may be eight bits in length, and may indicate the type of frame that the DL message 600 comprises. For example, the frame type 606 may comprise the value "0x04" to indicate that the DL message 600 is an open poll message. The sequence number 608 may comprise sixteen bits, and may indicate the sequence number of the DL message 600, which may be used to prevent duplicate messages or may be utilized by a receiving STA 106 to identify the DL message 600. In some aspects, the value of the sequence number 608 may be initialized at zero for the first frame transmitted to a STA 106, and incremented by one in each subsequent frame.

The time until the next frame 610 may comprise sixteen bits and may indicate a number of symbols before the next frame will be transmitted. If the value of the time until the next frame 610 is zero, a recipient STA 106 may ignore it. The slot index 612 may be eight bits in length, and may provide an index to the slot in which the current DL message 600 is being sent. In some aspects, the slot index 612 may start from zero and may be contiguous for a polling cycle 218. The polling cycle index 614 may comprise two bits, and may provide an index to the polling cycle 218 in which the DL message 600 itself is being sent. The polling cycle index 614 and the slot index 612 together can uniquely identify the location of a slot 201 in a system cycle 202. The polling cycle index 614 can start from zero and be contiguous in a polling cycle 218.

The payload size 616 may comprise fourteen bits, and may indicate the size of the payload 618 in units of bytes. When the payload 618 is not transmitted as part of the DL message 600, the payload size 616 may indicate that the size of the payload 618 is zero. The payload 618 may comprise a variable number of bits, and may comprise the data which an AP 104 is attempting to transmit to a STA 106, such as application data. The padding 620 may comprise a variable number of bits, which may be used to extend the length of the DL message 600 to fill the remaining time of a slot 201, or at least a portion thereof, and keep the channel fully occupied.

Figure 7:
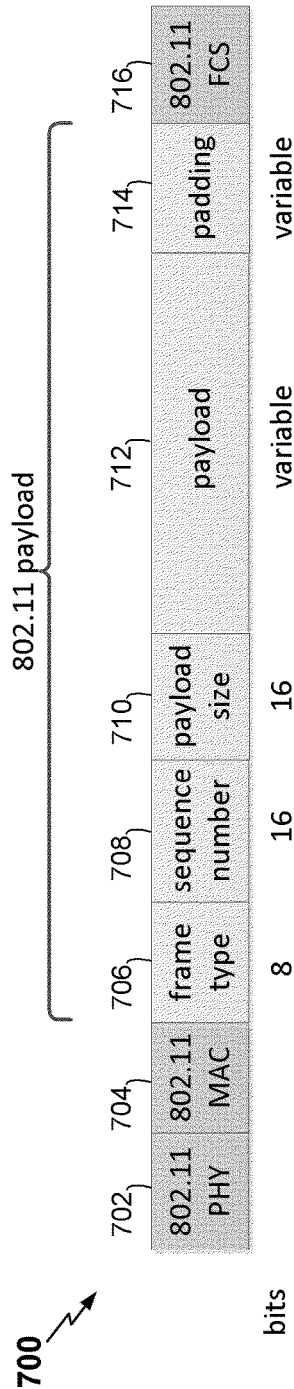
FIG. 7 is a block diagram illustrating an exemplary uplink message frame format, in accordance with an embodiment.

FIG. 7 is a block diagram illustrating an exemplary UL message 700 frame format, in accordance with an embodiment. As illustrated, the UL message 700 frame format may comprise an 802.11 PHY header 702, an 802.11 MAC header 704, a frame type 706, a sequence number 708, a payload size 710, a payload 712, padding 714, and an 802.11 FCS 716. The 802.11 PHY header 702, the 802.11 MAC header 704, and the 802.11 FCS 716 may be similar to the respective portions of the SUM 500 discussed above.

The frame type 706 may be eight bits in length, and may indicate the type of frame that the UL message 700 comprises. For example, the frame type 706 may comprise the value "0x05" to indicate that the UL message 700 is a join message (for Type-A STAs 106). The sequence number 708 may comprise sixteen bits, and may indicate the sequence number of the UL message 700, which may be used to prevent duplicate messages or may be utilized by a receiving AP 104 to identify the UL message 700. In some aspects, the value of the sequence number 708 may be initialized at zero for the first frame transmitted to an AP 104, and incremented by one in each subsequent frame.

The payload size 710 may comprise sixteen bits, and may indicate the size of the payload 712 in units of bytes. When the payload 712 is not transmitted as part of the UL message 700, the payload size 710 may indicate that the size of the payload 712 is zero. The payload 712 may comprise a variable number of bits, and may comprise the data which a STA 106 is attempting to transmit to an AP 104, such as application data. The padding 714 may comprise a variable number of bits, which may be used to extend the length of the UL message 700 to fill the remaining time of a slot 201, or at least a portion thereof, and keep the channel fully occupied.

Figures 8, 9:
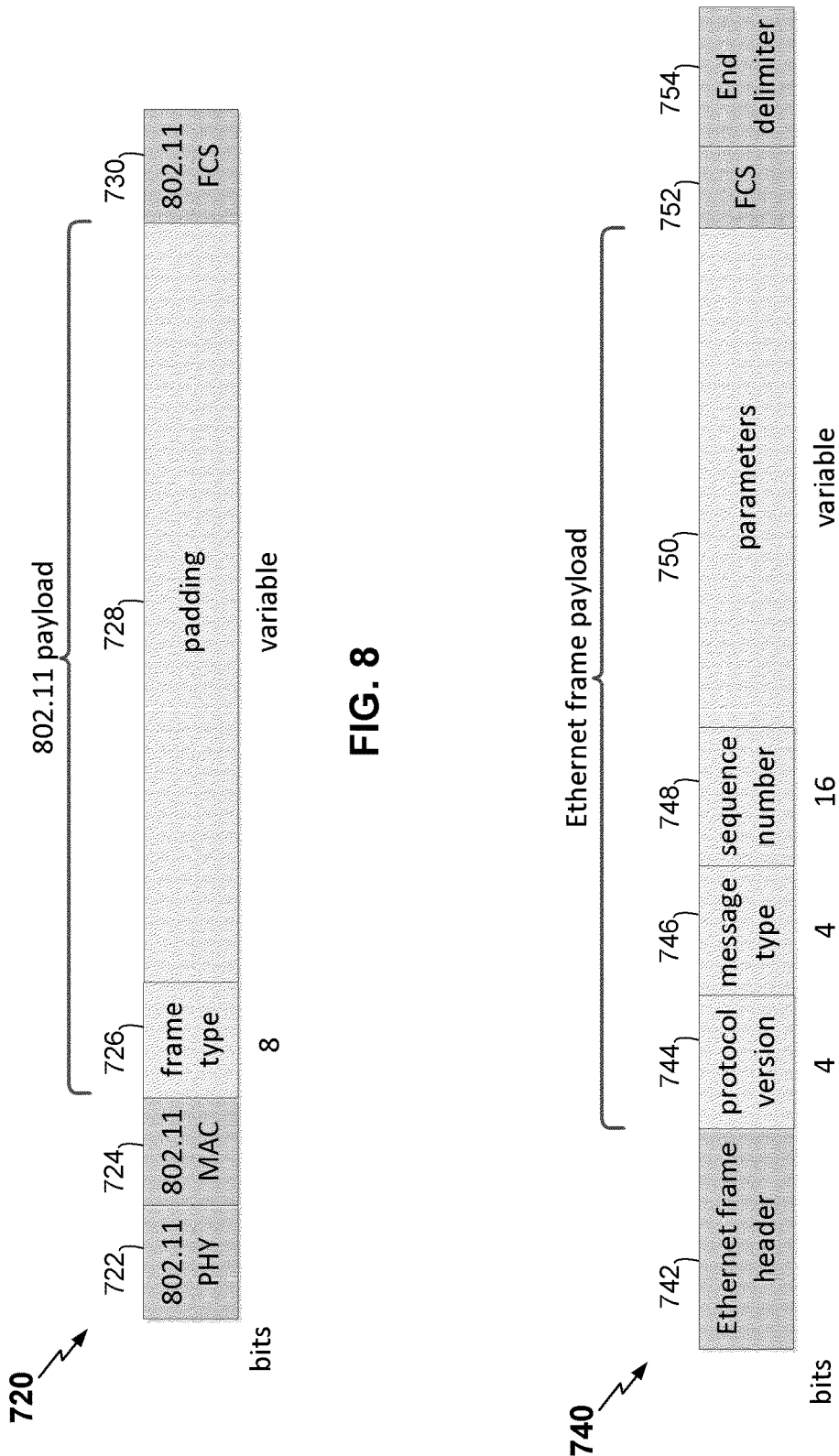
FIG. 8 is a block diagram illustrating an exemplary filler frame format, in accordance with an embodiment.
FIG. 9 is a block diagram illustrating an exemplary backhaul message frame format, in accordance with an embodiment.

FIG. 8 is a block diagram illustrating an exemplary filler frame 720 format, in accordance with an embodiment. As illustrated, the filler frame 720 format may comprise an 802.11 PHY header 722, an 802.11 MAC header 724, a frame type 726, padding 728, and an 802.11 FCS 730. As illustrated, the filler frame 720 may not comprise a payload. The 802.11 PHY header 722, the 802.11 MAC header 724, and the 802.11 FCS 730 may be similar to the respective portions of the SUM 500 discussed above.

The frame type 726 may be eight bits in length, and may indicate the type of frame that the filler frame 720 comprises. For example, the frame type 726 may comprise the value "0x02" to indicate that the filler frame 720 is a filler frame. The padding 728 may comprise a variable number of bits, which may be used to extend the length of the filler frame 720 to fill the remaining time of a slot 201, or at least a portion thereof, and keep the channel fully occupied. In some aspects, the filler frame 720 may be transmitted to fill any gap in channel time longer than DIFS.

FIG. 9 is a block diagram illustrating an exemplary backhaul message 740 frame format, in accordance with an embodiment. As illustrated, the backhaul message 740 frame format can comprise an Ethernet frame header 742, a protocol version 744, a message type 746, a sequence number 748, parameters 750, a FCS 752, and an end delimiter 754. The Ethernet frame header 742 may comprise information for use for the transmission of the backhaul message 740 itself.

The protocol version 744 may be four bits in length, and may indicate a version of the protocol used by the system. The message type 746 may comprise four bits, and may identify the type of message that the backhaul message 740 comprises. In some aspects, the values listed in the table of FIG. 15B may be utilized to provide this information. For example, the message type 746 may comprise the value "0x00" to indicate that the backhaul message 740 is a data message.

The sequence number 748 may comprise sixteen bits, and may indicate the sequence number of the backhaul message 740, which may be used to prevent duplicate messages or may be utilized by a receiving AP 104 to identify the backhaul message 740. In some aspects, the value of the sequence number 748 may be initialized at zero for the first frame of each message type 746 transmitted by an AP 104, and incremented by one in each subsequent frame. In some aspects, a sender AP 104 can maintain a sequence number stream for each type of message that it sends to each destination address, including broadcast messages. The parameters 750 may comprise the information that one AP 104 is attempting to convey to another AP 104, such as handoff information. The FCS 752 may be utilized to determine whether there have been any errors in the transmission of the backhaul message 740. The end delimiter 754 may be used to delimit the end of the backhaul message 740.

Figure 10:
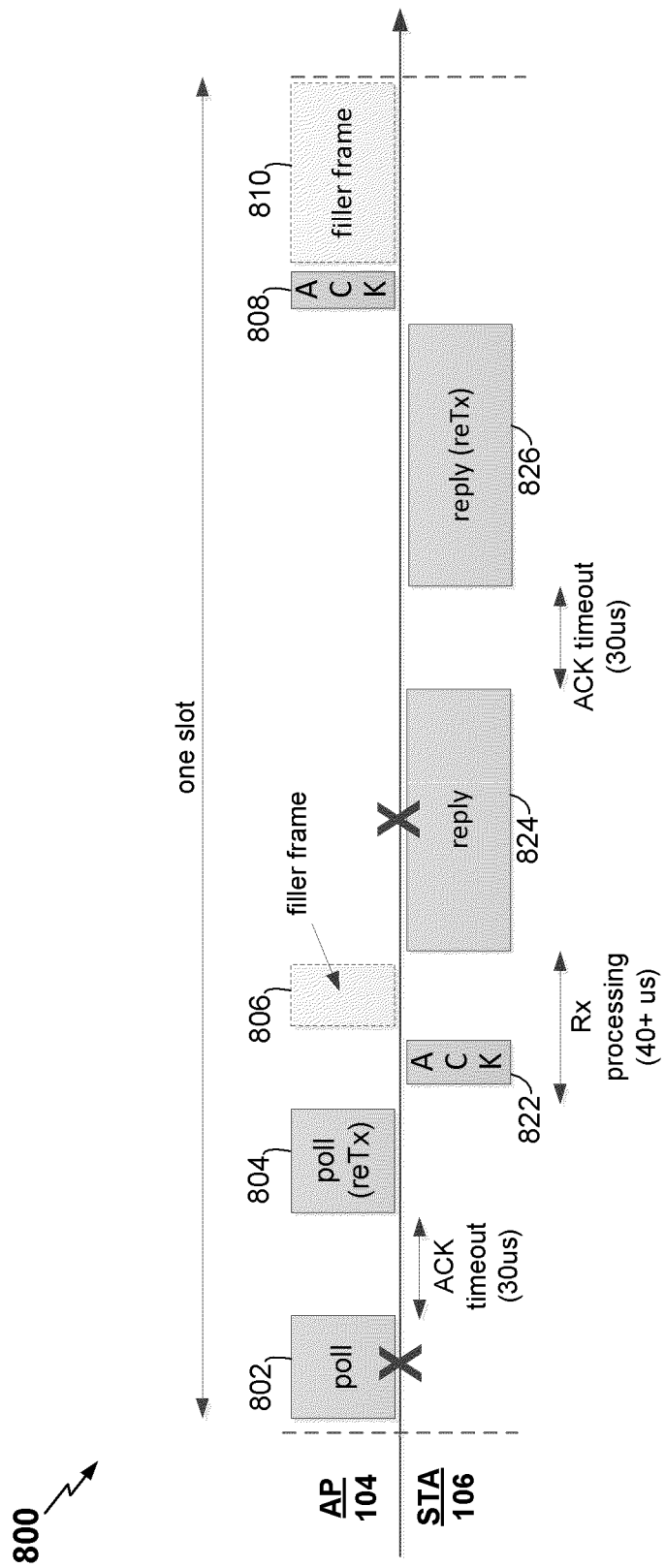
FIG. 10 shows a timing diagram illustrating an exemplary data exchange, in accordance with an embodiment.

FIG. 10 shows a timing diagram illustrating an exemplary data exchange 800, in accordance with an embodiment. As illustrated, the data exchange 800 may occur between an AP 104 and a STA 106 of FIG. 1. In an embodiment, the data exchange 800 may occur within a unicast slot 244 of FIG. 2.

Data exchange 800 may start with the transmission of a poll 802 by the AP 104 to the destination STA 106. The poll 802 may be transmitted in accordance with the frame format of the DL message 600 of FIG. 6, and may, or may not, include a payload. In response to successfully receiving the poll 802, the STA 106 can be configured to transmit an ACK. In some aspects, if the AP 104 does not receive the expected ACK before a specified period of time (e.g., 30 µs), the AP 104 may timeout, and may transmit the poll 802 again as a retransmitted poll 804. In an embodiment, if no ACK is received from the STA 106 after an ACK timeout again, after transmission of the retransmitted poll 804, and the time until the end of the slot 201 is longer than a DIFS, the AP 104 may send a filler frame to fill the remaining time of the slot 201.

If the AP 104 receives an ACK 822, the AP 104 can wait for an UL frame from the STA 106. Conditionally, if the delay between receipt of the ACK 822 and the start of the expected UL frame is determined to be longer than a DIFS (e.g., illustrated as 40 µs or more), the AP 104 may send a filler frame 806 after the STA's ACK 822. In an embodiment, the transmission time of the filler frame 806 can be just enough to cover this delay. Transmission of this filler frame 806 may prevent other devices from capturing the channel, as other devices may utilize a CCA threshold that is greater than 40 µs (e.g., 45 µs).

After transmitting the filler frame 806, the STA 106 may attempt to transmit a reply 824, which may be transmitted in accordance with the UL message 700 frame format of FIG. 7. However, there may be a transmission error, and the AP 104 may not receive the reply 824. Accordingly, when the STA 106 does not receive an ACK after a certain amount of time, the STA 106 may timeout, and transmit the reply 824 again as a retransmitted reply 826. If the STA 106 has no data to send, it can send back a filler frame with a payload that is the same size as regular application data, which may be used to keep the channel occupied. The AP 104 may receive the retransmitted reply 826 from the STA 106, and upon successfully receiving it, the AP 104 can reply to the STA 106 with an ACK 808. Thereafter, if the time until the end of the slot 201 is expected to be longer than a DIFS, the AP 104 can send a filler frame 810 to fill the remaining time of the slot 201. In some aspects, if no ACK is received from the AP 104 after the ACK times out after transmitting the retransmitted reply 826, and the time until the end of the slot 201 is longer than a DIFS, the STA 106 can send a filler frame to fill the remaining time of the slot 201.

When a STA 106 wants to join a ULOLAT system, the STA 106 may first scan potential channels until it finds an AP 104 with the strongest signal strength (e.g., measured in average RSSI). In some aspects, STAs 106 can be configured with a set of operating channels (e.g., STA 106 may have knowledge of the existence of the wireless communication channels CH1 and CH2 of FIG. 2). In an embodiment, when a STA 106 is booting up, a STA 106 can scan each of its candidate operating channels and then select an AP 104 to join, after finding the best candidate AP 104. For example, when on a channel, the STA 106 can operate in a "promiscuous mode" and listen for DL frames or other messages from any ULOLAT AP 104. When a message is received from an AP 104, the STA 106 can measure an RSSI for the channel and note the address of the sending AP 104. The STA 106 may receive messages from more than one AP 104 on the same channel.

In some aspects, the STA 106 can stay on a channel for at least a minimum duration of $T_{init}$ to measure the RSSI of the channel during a boot up procedure. In an embodiment, $T_{init}$ can be one second, or any amount of time greater than 10 ms. At the end of this period, STA 106 can calculate an average RSSI of every AP 104 from which it has received frames. After the STA 106 has scanned all of its candidate channels, the STA 106 can select the AP 104 with the highest average RSSI to perform a join procedure. In an embodiment, when a STA 106 fails to receive a SUM from its current AP 104 for $N_{recovery}$ continuous system cycles 202, the STA 106 may assume it has lost connection to the current AP 104 and perform the boot-up procedure described above to find a new AP 104 to join. In an embodiment, $N_{recovery}$ may be set to a default of twenty, and in some aspects may be greater than or equal to ten.

Figure 11:
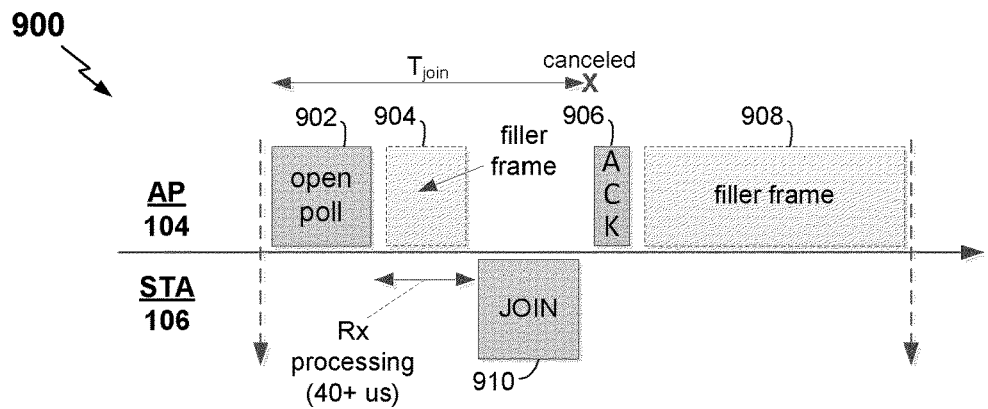
FIG. 11 shows a timing diagram illustrating an exemplary join procedure message transmission, in accordance with an embodiment.

Once the STA 106 has selected an AP 104 to join, the STA 106 can listen for DL frames from the selected AP 104 until it receives a SUM, such as the SUM 500 of FIG. 5. From this SUM the STA 106 can extract basic information about the system such as which MCS to use for its transmissions and a channel set for the cell 102 that includes the AP 104. After receiving the SUM, the STA 106 can monitor or listen until it receives an open-poll message. For example, FIG. 11 shows a timing diagram illustrating an exemplary join procedure message transmission 900, in accordance with an embodiment.

As part of the join procedure, the AP 104 may first transmit an open-poll message 902. After the AP 104 sends the open-poll message 902, it can start a timer with a length $T_{join}$ and wait until it received a reply (e.g., join message 910) from a STA 106. The duration of $T_{join}$ can be longer than the sum of the processing delay at the STA 106 and the transmission time of the join frame. In an embodiment, $T_{join}$ may be set to a default value of 68 μs, and in some aspects may be greater than or equal to 20 μs. If the processing delay at the STA 106 is expected to be longer than a DIFS, the AP 104 can transmit a filler frame 904 after transmitting the open-poll message 902, with transmission time of the filler frame 904 being long enough to cover the processing delay.

With a probability $p_{join}$, the STA 106 can reply to the AP 104 with a join message 910. In an embodiment, $p_{join}$ may range from zero to one, and may be set to a default value of 0.5. In some aspects, the join message 910 may be similar to the UL message 700 of FIG. 7, with the frame type 706 set to indicate whether the STA 106 is requesting to join as a Type-A or a Type-B STA 106. Otherwise, the STA 106 can try to join again after receiving the next open-poll frame.

Figure 12:
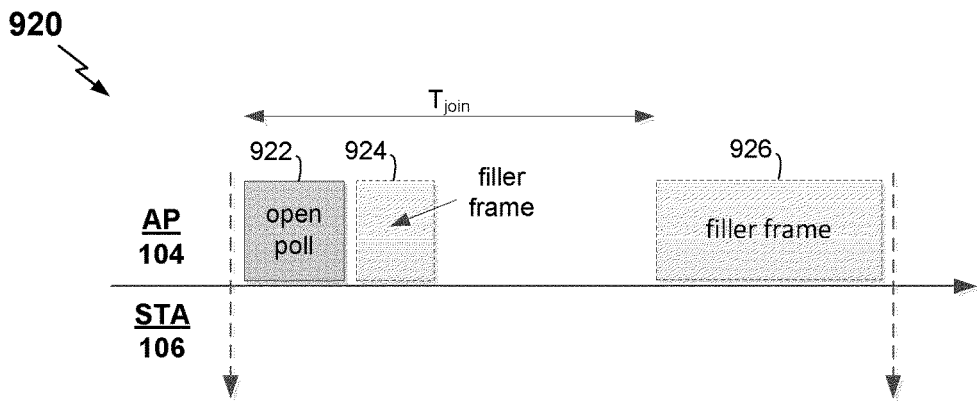
FIG. 12 shows a timing diagram illustrating an exemplary join procedure message exchange, in accordance with an embodiment.

If no join message is successfully received by the time $T_{join}$ expires, the AP 104 can transmit a filler frame to keep the channel occupied until the end of the slot 201, unless the residual time of the slot 201 is shorter than a transmission time of the shortest frame or a DIFS. For example, FIG. 12 shows a timing diagram illustrating an exemplary join procedure message exchange 920, in accordance with an embodiment. As illustrated, as part of the join procedure, the AP 104 may transmit an open-poll message 922 and a filler frame 924, similar to the procedures described above. However even after the timer set to $T_{join}$ expires, the AP 104 may not have received a join request. Accordingly, in response to $T_{join}$ expiring, the AP 104 may transmit a filler frame 926 to occupy the channel for the remainder of the slot 201.

Referring back to FIG. 11, if the join message 910 is successfully received by the AP, it can send a layer-two ACK 906 back to the STA. After the STA 106 sends the join message 910, the STA 106 may receive the layer-two ACK 906 before the expiration of an ACK timeout, which can indicate that the STA's 106 request to join has succeeded. The STA 106 can stay on the current channel and listen for the AP's 104 authentication request. If no ACK is received before the expiration of the ACK timeout, then the STA 106 may determine that its request to join has failed. In this case, the STA 106 may retransmit the join message 910 once.

Figure 13:
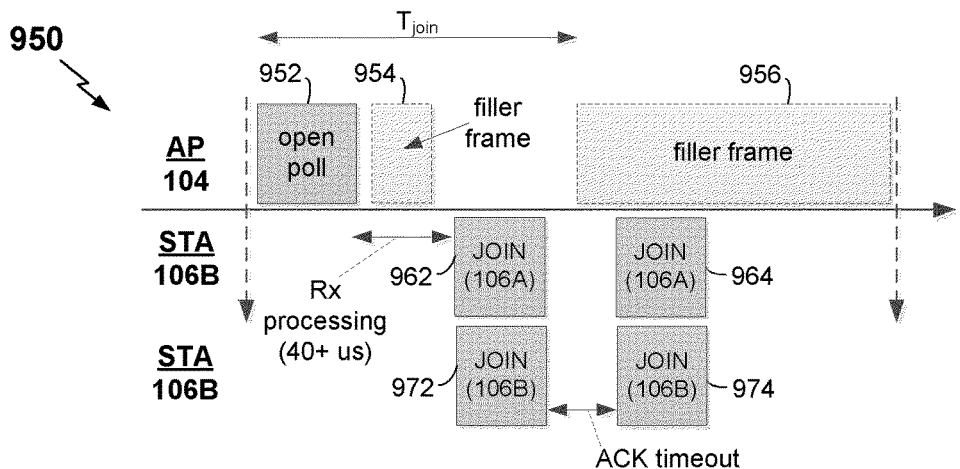
FIG. 13 shows a timing diagram illustrating an exemplary join procedure message exchange, in accordance with an embodiment.

For example, FIG. 13 shows a timing diagram illustrating an exemplary join procedure message exchange 950, in accordance with an embodiment. As part of the message exchange, the AP 104 may transmit an open-poll frame 952, set the duration of $T_{join}$ (e.g., set to expire a SIFS after the expected finish time of a join request), and transmit a filler frame 954 as described above. Thereafter, two STAs 106A and 106B may contend for access by both transmitting join requests 962 and 972. In this case, the AP 104 may fail to decode any request, because two STAs 106 have sent their requests at the same time. Accordingly, the AP 104 may send a filler frame 956 upon expiration of $T_{join}$. In some aspects, the STAs 106A and 106B may retransmit their join messages as retransmission 964 and 974, after an ACK timeout, which may result in collision again.

If a STA 106 does not succeed in receiving an ACK by the end of the current slot 201, the STA 106 can try again after receiving the next open poll frame, until a retry limit ($N_{join}$) is reached. In an embodiment, $N_{join}$ may be set to a default value of five, and in some aspects may be greater than or equal to one. When the retry limit has been reached, an error indication can be sent to the application (e.g., via the STA 106).

Referring back to FIG. 11, if the join request by the STA is successful but the AP 104 is out of capacity, the AP can send the STA 106 a rejection message to the STA 106, which may be transmitted in accordance with the frame format of the DL message 600 of FIG. 6. In some aspects, the rejection message may be transmitted in an unassigned slot 201 in the next system cycle 202, in which the payload may include an error code to indicate the cause of the rejection. Otherwise, if the AP 104 has capacity for the STA 106, the AP 104 can use spare slots 201 (either an unassigned unicast slot 244 or an open-poll slot 246) to perform an authentication of the STA 106. In an embodiment, the authentication may be similar to the PSK-based authentication procedure as outlined in IEEE 802.11.

If the STA 106 fails the authentication test, the STA 106 can send an error indication to the upper-layer application. If the STA 106 fails to respond to the AP's 104 authentication request, for example, where the AP 104 has transmitted the ACK 906 to the STA 106 but the ACK 906 was lost, the AP 104 can abort the join procedure for the STA 106. If the STA 106 successfully passes the authentication test, the AP 104 can send the STA 106 an accept message, which may be transmitted in accordance with the DL message 600 frame format of FIG. 6. Thereafter, the AP 104 can assign one or more broadcast slots 242 and one or more unicast slots 244 to the STA 106. These broadcast slots 242 and unicast slots 244 may be referenced by a slot index, which may correspond to the broadcast group(s) and unicast slot(s) that the STA 106 subscribes to. If the authenticated STA 106 is a Type-A STA 106, the AP 104 may add the STA 106 to its scheduling list.

After the STA 106 is authenticated, the AP 104 can broadcast a message to all other APs 104 (including its peer APs 104 in the same wireless communication cell 102). This broadcast message may be a backhaul message 740 with the message type 746 set to indicate that the message is an accept message. This accept message can include the STA's 106 MAC address and encryption key, and a sequence number for the first frame. If the STA 106 is a Type-A, the accept message can also include the slot 201 index assigned to the STA. This slot 201 index may only be used by the peer APs 104 in the same wireless communication cell 102, and APs 104 in other cells 102 may ignore this index. Upon receiving this message, other APs 104 can add the STA 106 to their access list.

To ease user's effort in configuring STAs 106, configuration parameters used by STAs 106 may be provisioned OTA after authentication procedure and before data exchange begins. During the OTA provisioning, a STA 106 can stay on the same channel used for authenticating and keep listening for frames from the AP 104.

The set of configuration parameters provisioned OTA is listed in Table 1 below. The length of these parameters may be predefined.

TABLE 1

| Parameter | Default value | Range | OTA provision | Code | Length (byte) | Definition |
| --- | --- | --- | --- | --- | --- | --- |
| $N_{slot}$ | 20 | ≥1 | Yes | 0x01 | 1 | Number of slots per system cycle. May be calculated by user as duration of system cycle divided by average duration of a slot |
| $T_{slot}$ | 360 us | ≥100 us | Yes | 0x02 | 8 | Duration of a slot, in unit of symbol time used in the PHY |
| $T_{contention}$ | 5 ms | ≥1 ms | Yes | 0x03 | 8 | Duration of a contention period, in unit of slot durations |
| $N_{polling\_cycle}$ | 1 | ≥1 | Yes | 0x04 | 1 | Number of polling cycles per polling period |
| $N_{sum}$ | 2 | ≥1 | Yes | 0x05 | 1 | Number of repetition transmission per SUM |
| $N_{bcast}$ | 1 | ≥0 | No | — | — | Number of slots in a system cycle reserved for broadcast groups |
| $N_{open\text{-}roll}$ | 2 | ≥1 | No | — | — | Number of open poll slots per polling cycle |
| $N_{bcast\_rep}$ | 2 | ≥1 | Yes | 0x06 | 1 | Number of repetition transmissions per broadcast message |
| $P_{join}$ | 0.5 | ∈ (0, 1) | No | — | — | Probability that a STA can reply to the current Open Poll message (in step of 1/256). Pre-configured. |
| $N_{join}$ | 5 | ≥1 | Yes | 0x07 | 1 | Maximum number of access attempts that a STA may make |
| $T_{join}$ | 68 us | ≥20 us | No | — | — | Timer set after an Open Poll message to check if there is any join request from STAs |
| $T_{leave}$ | 1 hour | ≥0 hour | No | — | — | Maximum idle time a STA may have before AP unilaterally removes it from the system |
| $T_{rekey}$ | 24 hours | ≥1 hour | No | — | — | Rekey period |
| $T_{margin}$ | 0.5 msec | ≥0 msec | Yes | 0x08 | 1 | Extra time needed by STA before waking up for next frame (in step of 20 us) |
| $N_{open\_poll}$ | 2 | ≥1 | Yes | 0x09 | 1 | Number of slots reserved for open poll frames in a polling cycle |
| $N_{idle}$ | 10 | ≥1 | No | — | — | Number of idle system cycles before AP schedules a STA for long sleep |
| $N_{sleep}$ | 5 | ≥1 | No | — | — | The number of system cycles that STAs can sleep between wakeups |
| $T_{rekey}$ | 8 | ≥1 | No | — | — | Intervals between rekey procedures |
| $T_{init}$ | 1 sec | ≥10 ms | Yes | 0x0A | 1 | The minimum duration a STA has to stay on a channel and measure its signal strength during bootup procedure |
| $N_{recovery}$ | 20 | ≥10 | Yes | 0x0B | 1 | Number of SUMs a STA may miss in a row before it starts error recovery procedure |

TABLE 2

| | |
| --- | --- |
| Code for parameter 1 (1 byte) | Value of parameter 1 |
| Code for parameter 2 (1 byte) | Value of parameter 2 |
| ... | ... |

After receiving a message with OTA provisioning information, the STA can send back an ACK, which may be transmitted in accordance with the format of the UL message In some aspects the OTA parameters can be delivered to the STA 106 in one or more frames by unicast in a unicast slot 244 assigned to the STA 106 if the STA 106 is a Type-A STA. In some aspects, the OTA parameters may be delivered to the STA 106 in an unassigned slot 201 if the STA 106 is a Type-B STA 106. In various aspects, the OTA parameters may be transmitted in a DL message 600 of FIG. 6 with the frame type 606 set to indicate that the message is for OTA provisioning. The payload of these messages can be structured in accordance with Table 2 below.

700 of FIG. 7 with the frame type 706 set to indicate that the message is an OTA Provisioning ACK. If the AP 104 does not receive an ACK of a transmitted message with OTA provisioning information, the AP 104 can resend the message until an ACK is received.

Upon completion of the OTA provisioning procedure, the AP 104 can send a notification message to its peer APs 104 in the same wireless communication cell 102, after which all of the APs 104 in the cell 102 can start polling the STA 106. This notification message may be a backhaul message 740 with the message type set to indicate that the message is a data start message.

The join procedure, the subsequent authentication, and the OTA provisioning procedures can be performed on the same channel. In some aspects, the STA 106 can continue to listen to this same channel until the procedures are complete. Thereafter, the STA 106 can switch to the primary channel of its current cell 102 and start a channel access protocol.

As part of the channel access protocol, an AP 104 may cycle through CCA phases 212, GIs 214, SUM phases 216, polling periods 206, and contention periods 230 in system cycles 202, as described above with respect to FIG. 2. In addition, the AP 104 may calculate a default start time of each system cycle 202, which may refer to the start time of a system cycle 202 if there is no interference present. At the default start time, the primary channel is the first channel on which a system cycle starts, then the secondary channel, and so on. For example, channel CH1 of FIG. 2 may be the primary channel and channel CH2 may be the secondary channel. The default start time of a system cycle 202 on the secondary channel can be after the end of the polling period 206 in the same system cycle 202 on the primary channel. The duration of the default contention period 230 can be chosen such that there is no overlap between polling periods 206 on different channels (e.g., it can be equal to or longer than the sum of a polling period 206 on all the channels). An AP 104 can know its order in transmission and its channel index through configuration or provisioning.

An actual start time of a system cycle 202 may be later than its default start time, if interference in the prior contention period 230 continues beyond its boundary. The nomenclature "S(c, n)" may refer to the default start time of the nth system cycle on channel c, and "T(c, n)" may refer to the actual start time of the nth system cycle on channel c. In some aspects, lower-order channels can calculate their S(c, n) based on S(0, n). For example, in a cell 102, the AP 104 on the primary channel can act as the leader in setting the default start times. At S(0, n), the primary AP 104 can send a backhaul message 740 (e.g., with the message type 746 set to indicate that the message is a system cycle start message) to its peer APs 104 over the backhaul. When other APs 104 receive this message, they can use their receiving time to approximate S(0, n) (for example, offset it by the expected delay over the backhaul). Thereafter, the APs 104 can use this approximation as the reference to calculate their own S(c, n). In some aspects, there can be a random delay when the message goes over the backhaul. However, because this delay may be small compared to other components in the protocol, or because system cycles 202 always start later on lower-order channels, this delay can be treated as a special kind of interference that delays S(c, n) and therefore does not sufficiently affect how the protocol works.

In an embodiment, the APs 104 do not inform each other of the values of their actual start times (T(c, n)). APs 104 may generally withhold their transmissions during contention periods 230, at least with respect to ULOLAT devices. In some aspects, if Wi-Fi transmissions in a contention period 230 continue beyond a ULOLAT AP's 104 default start time of the next system cycle 202, the ULOLAT AP 104 may be required to wait for the Wi-Fi transmissions to end. In accordance with these aspects, the ULOLAT AP 104 can reduce the duration of its contention period 230, in order to keep the default schedule for its subsequent system cycles 202. If the end of nth polling period has passed beyond S(c, n+1), then the ULOLAT AP 104 can keep transmitting without any contention period 230 in between ULOLAT transmission cycles 204.

Figure 14A:
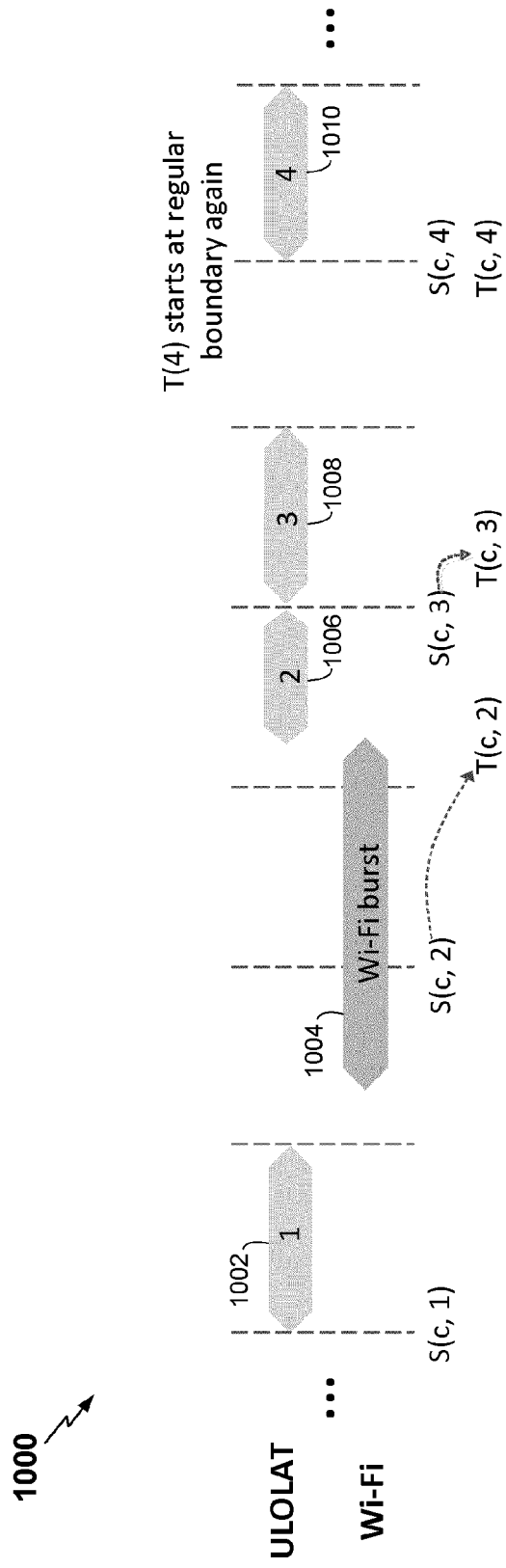
FIG. 14A shows a timing diagram illustrating an exemplary transmission of repetition cycles, in accordance with an embodiment.
Figure 14B:
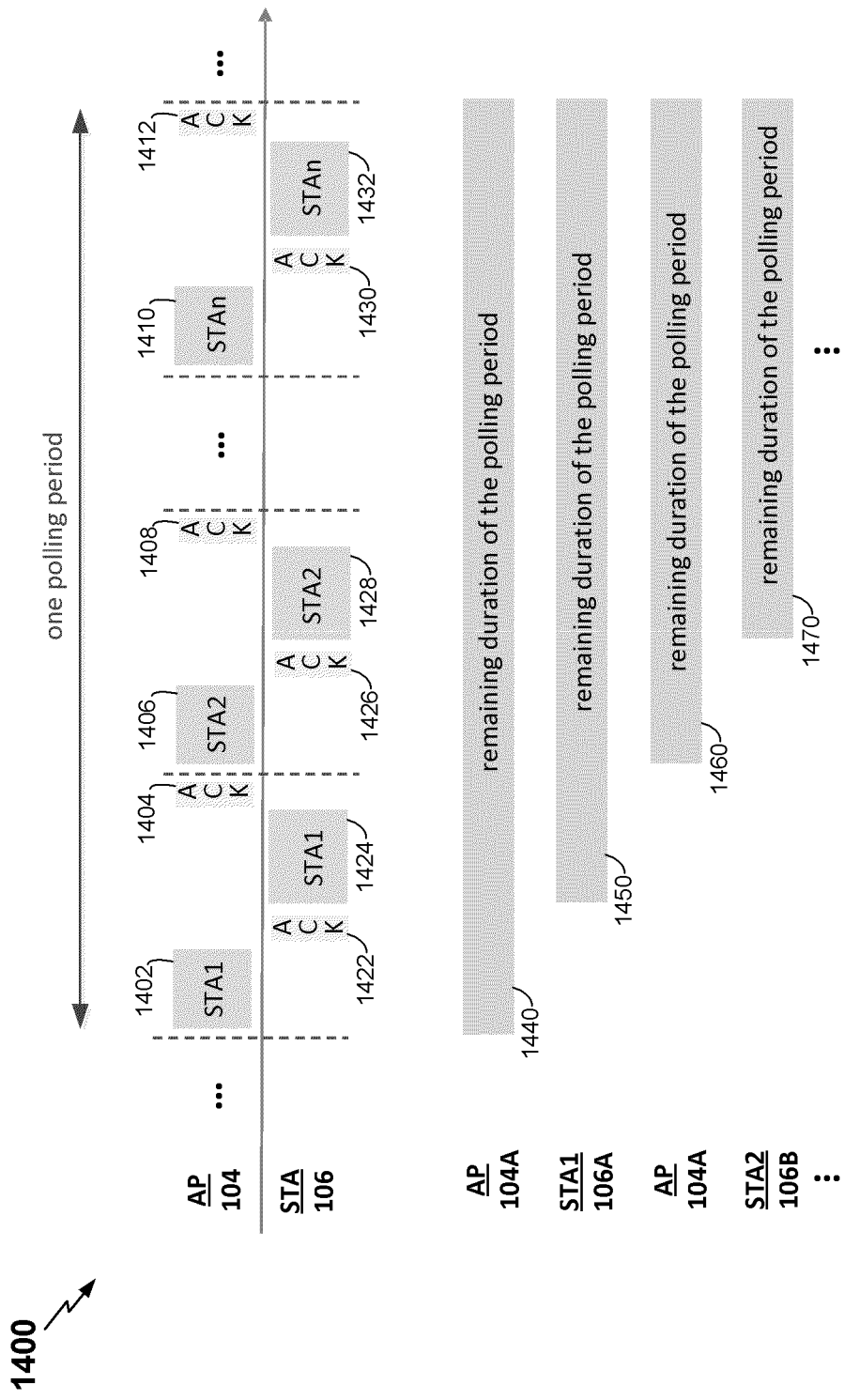
FIG. 14B shows a timing diagram illustrating an exemplary message exchange, in accordance with an embodiment.

For example, FIG. 14B shows a timing diagram 1000 illustrating an exemplary transmission of repetition cycles, in accordance with an embodiment. As illustrated, the ULO-LAT AP 104 may transmit a first system cycle 1002 with the actual start time equal to the default start time. However, the Wi-Fi burst transmission 1004 may delay the default start time S(c, 2) of the second system cycle 1006 by more than half of a system cycle, which in turn affects the default start time S(c, 3) of the third system cycle 1008. In this case, after the AP 104 finishes the second system cycle 1006, it can start the third system cycle 1008 without any contention period in between.

In some aspects, if there is only a short gap (a configurable threshold) between end of the nth polling period and S(c, n+1), the AP 104 can transmit either open-poll slots 246 and/or filler frames during this gap to prevent Wi-Fi devices from using this gap to capture the channel. When the AP 104 sends a DL message 600, in the frame header it can set the time until the next frame 610 to the amount of time from the current time until the expected start time of the same slot 201 in the earliest future polling cycle 218 in the next system cycle 202. When the AP 104 sends a SUM 500, the time until the next SUM 512 in the frame header can be set to the difference between S(c, n+1) and T(c, n). In some aspects, the AP 104 may set the transmission time offset 514 in the frame header to the value of T(c, n)−S(c, n).

If sleep mode is enabled, when sending a SUM 500 in the nth system cycle, the AP 104 can set its time until the next SUM 512 to the difference between the current time and the default start time of the earliest kth system cycle on the primary channel, where k modulo $N_{sleep}$ is equal to 0. If there is an update to the fields in the SUM 500, the AP 104 can hold the update until the earliest kth system cycle in the future where k modulo $N_{sleep}$ is equal to 0. For each broadcast slot 242 and unicast slot 244 in a polling period 206, the AP 104 can keep a traffic activity counter $K_{idle}$. This traffic activity counter may only be updated when a slot is active. This counter can be incremented by one if there is no application data in the slot. ULOLAT control messages may not cause this counter to increment. This counter can be reset to zero if there is actual data in the slot (e.g., an actual broadcast frame in a broadcast slot 242 or application data on either DL or UL in a unicast slot 244), or if there is a transmission error on UL in a unicast slot 244. When this counter reaches $N_{idle}$, the AP 104 can mark the identified slot 201 as idle. In each system cycle 202 where the slot is idle, the AP 104 can set time until the next frame 610 of the DL message 600 to the difference between the current time and the default start time of the earliest kth system cycle in the future on the primary channel, where k modulo $N_{sleep}$ is equal to 0.

When new application data arrives for a slot 201 that is currently in an idle state, the AP 104 may keep sending it in the subsequent system cycles 202 until a reply from the STA 106 is received, until the data has reached the end of its deadline, or until the earliest kth system cycle 202 in the future on the primary channel is reached, where k modulo $N_{sleep}$ equals to 0. After that, the AP 104 can mark the slot 201 active.

With polling periods 206 repeated on multiple channels, one important step in a STA's 106 protocol can be to decide when to operate on which channel. Accordingly, in some aspects, a STA 106 may make this decision by tracking the earliest expected start times among all slots 201 on all the channels.

An expected start time (EST) of a slot 201 can be calculated based on the actual start time of a SUM or another data frame. A default start time (DST) of a slot 201 can be calculated based on the default start time of the current system cycle 202 on the same channel. Before EST becomes available, DST may be used by a STA 106 to determine the next expected slot. The actual receiving time (ART) of a slot may refer to the time when the receiving starts, with respect to the DST of the current system cycle 202 on the primary channel.

As part of a ULOLAT protocol, a STA 106 can track SUMs in the same way as it tracks broadcast slots 242. In some aspects, when a STA 106 receives a valid DL message from its AP 104 (whose destination does not have to be the STA's 106), the STA 106 can perform various procedures. For example, the STA 106 may use the ART and EST of the DL message to update the EST of future slots 201 in the current polling period 206. If the STA 106 is the destination of the DL message, and the current slot 201 is successfully completed, then the STA 106 can set the EST of this slot 201 to $T_{next}$, where $T_{next}$ is equal to the sum of ART and the time until the next frame. Successful completion of the current slot 201 may refer to an instance where the received DL message is a SUM or broadcast message, where the STA 106 has no UL data to send in the current system cycle 202, or when the UL data transmitted by the STA 106 was successfully received by the AP 104. After successful completion, the STA 106 does not need to visit this slot 201 again until $T_{next}$.

If the STA's 106 UL transmission has failed (e.g., no ACK received), the STA 106 can set the EST of this slot 201 to the DST of the same slot 201 in the earliest future cycle in the next system cycle 202. At the expected finish time of a slot 201 (e.g., the sum of EST and $T_{slot}$), the STA 106 can determine the next expected slot 201, which can have the earliest EST among all of the slots 201 (across all of the channels) that have an EST later than the current time. The current time here can be expressed as an offset from the default start time of the current system cycle on the primary channel. In an embodiment, the STA should opportunistically sleep between frames based on its own decision.

In some aspects, the AP 104 can periodically update unicast and broadcast keys for all of the STAs 106 with a period of $T_{key}$, which may be user configurable. In some aspects, a procedure based on IEEE 802.11i rekey protocol may be utilized. The AP 104 may first update a STA's 106 unicast keys. As part of this update, the AP 104 can broadcast a rekey message to all STAs 106. This rekey message may be a DL message 600 with the frame type 606 indicating that the message is a rekey message. Upon receiving this rekey message, all STAs 106 can stay on the primary channel until they have both unicast and broadcast keys updated. After broadcasting the rekey message, the AP 104 can then update new unicast keys with individual STAs 106. For Type-B STAs 106, the AP can update the unicast keys in spare unicast slots 244. Updating the unicast keys for Type-A STAs 106 may occur in the assigned unicast slots 244. If a STA 106 fails to respond to the rekey request message after $K_{rekey}$ attempts, the AP 104 can assume the STA 106 has left the system and remove it from its access list and scheduling list.

After updating the unicast keys, the AP 104 can update the broadcast key. As part of updating the broadcast keys, the AP 104 can send an updated broadcast key to all STAs 106, one by one through unicast, using the new unicast keys generated in the previous step. In addition, the AP 104 can include a time when the new broadcast keys become effective. This time can be chosen such that with a very high probability all STAs 106 have received the new broadcast key by then. The STAs 106 can start using the new broadcast key at the time signaled by the AP 104. For simplicity of implementation, in some aspects, the broadcast keys may not be updated when a STA 106 leaves the system.

When transmitting, both AP 104 and STAs 106 can set a "duration" field in the MAC-layer header of their frames to the remaining duration of the current polling period 206, as shown in FIG. 14B. This duration field can be decoded and honored by nearby Wi-Fi devices, and may help inform the Wi-Fi devices of ULOLAT's transmissions, which the device may utilize to postpone their transmission attempts accordingly.

The AP 104 or the STAs 106 can estimate the remaining duration based at least in part upon its current slot 201 index and the number of remaining polling cycles 218 in the current polling period 206. In some aspects, a different calculation may be made for join frames. Instead, a STA 106 can derive the remaining duration by taking the duration field in the open-poll frame, subtract it by the transmission time of the open-poll frame and use the remainder as its own duration field value.

FIG. 15A is a table 1500 providing exemplary values for a frame type field, in accordance with an embodiment. In some aspects, the frame type field may be one or more of the frame type 506 of FIG. 5, the frame type 606 of FIG. 6, the frame type 706 of FIG. 7, or the frame type 726 of FIG. 8. As illustrated, a value of "0x00" may indicate that the message is a data frame, a value of "0x01" may indicate that the message is a management frame, a value of "0x02" may indicate that the message is a filler frame, a value of "0x03" may indicate that the message is a SUM, a value of "0x04" may indicate that the message is an open-poll message, a value of "0x05" may indicate that the message is a join message for Type-A STAs 106, a value of "0x06" may indicate that the message is a join message for Type-B STAs 106, a value of "0x07" may indicate that the message is a handoff join message, a value of "0x08" may indicate that the message is an accept message for joining, a value of "0x09" may indicate that the message is a rejection message for joining, a value of "0x0A" may indicate that the message is a leave message, a value of "0x0B" may indicate that the message is a handoff message, a value of "0x0C" may indicate that the message is a rekey message, a value of "0x0D" may indicate that the message is an OTA provisioning message, a value of "0x0E" may indicate that the message is an ACK message for OTA provisioning, and other values may be reserved for other embodiments. The particular values described herein are merely exemplary, as other values may be used in different embodiments.

FIG. 15B is a table 1550 providing exemplary values for a message type field, in accordance with an embodiment. In some aspects, the message type field may be the message type 746 of the backhaul message 740 of FIG. 9. As illustrated, a value of "0x00" may indicate that the message is a data message, a value of "0x01" may indicate that the message is an accept message, a value of "0x02" may indicate that the message is a data start message, a value of "0x03" may indicate that the message is a SUM start message, a value of "0x04" may indicate that the message is a system cycle start message, a value of "0x05" may indicate that the message is a handoff request message, a value of "0x06" may indicate that the message is a handoff reply message, and any other value may be reserved for other embodiments. The particular values described herein are merely exemplary, as other values may be used in different embodiments.

Figure 16:
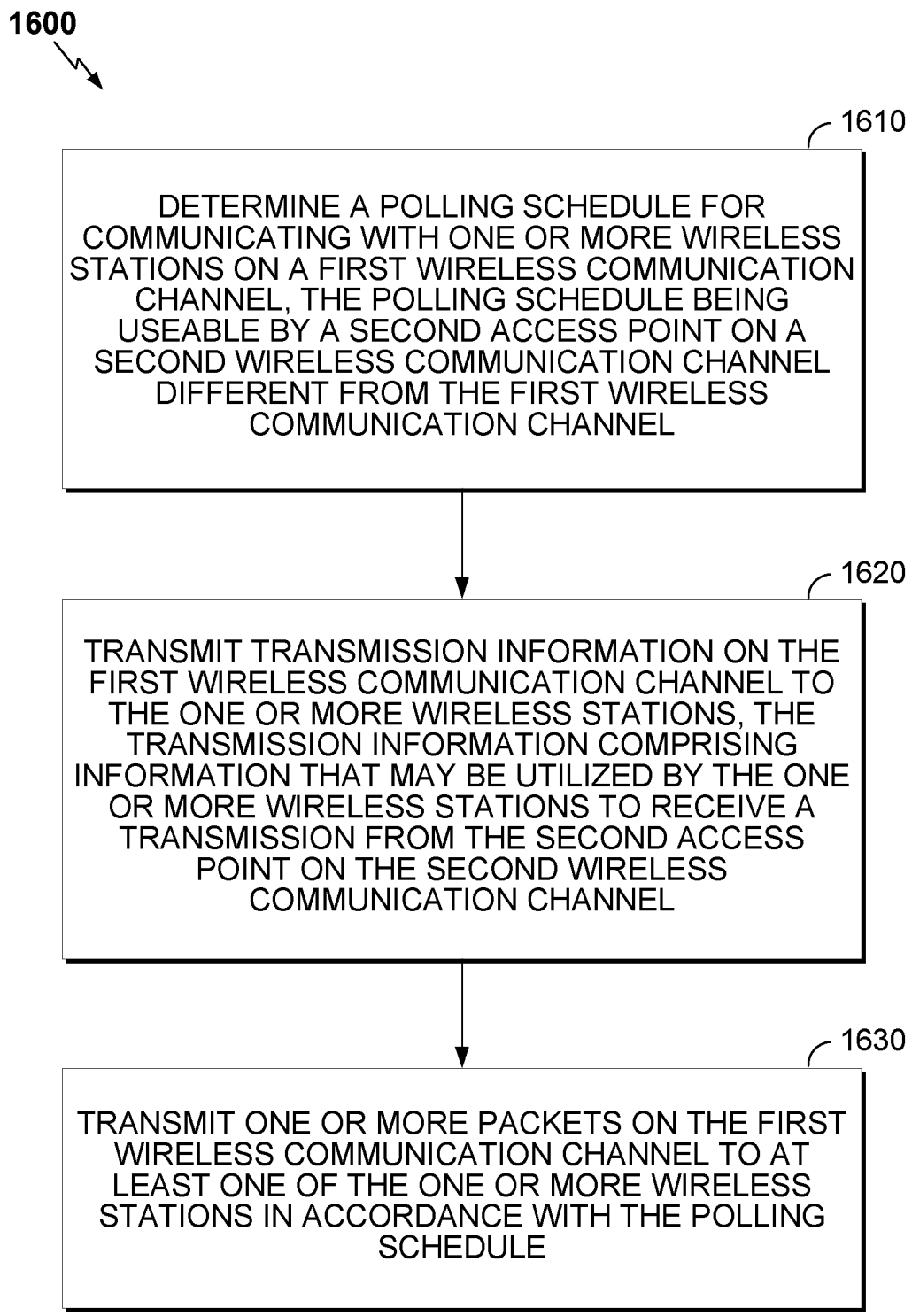
FIG. 16 is a flowchart illustrating an exemplary method of communicating in a wireless communication network, in accordance with an embodiment.

FIG. 16 is a flowchart illustrating an exemplary method of communicating in a wireless communication network, in accordance with an embodiment. In some aspects, method 1600 may be performed within the wireless communication network 100 of FIG. 1 by one or more of the APs 104, such as AP 104A. AP 104A may operate on wireless communication channel CH1 of FIG. 2, and the wireless communication network 100 may further comprise AP 104B operating on wireless communication channel CH2 of FIG. 2.

Method 1600 may start at block 1610, where the first AP 104A, for example, can determine a polling schedule for communicating with one or more wireless stations on a first wireless communication channel CH1, the polling schedule for use by a second AP 104B on a second wireless communication channel CH2 different from the first wireless communication channel CH1. In some aspects, the polling schedule comprises a first timing sequence for communication on the first wireless communication channel CH1, and a second timing sequence for communication on the second wireless communication channel CH2, wherein the second timing sequence is equivalent to or has the same time duration as the first timing sequence, but starts at a time offset from the start time of the first timing sequence. In various embodiments, the first AP 104A and the second AP 104B are in a same wireless communication cell. In an embodiment, the various means for determining or means for assigning can comprise a processor or a related component, such as one or more of the modem component 320, the LBT component, the polling component 324, the timer 328, the PHY component 340, the handover component 350, or their functional equivalents.

At block 1620, the first AP 104A, for example, can transmit transmission information to the one or more wireless stations on the first wireless communication channel CH1, the transmission information comprising information for use by the one or more wireless stations to receive a transmission from the second AP 104B on the second wireless communication channel CH2. In some aspects, the polling schedule for communications by the first AP 104A to the one or more STAs 106 is non-overlapping in time with the polling schedule for communications by the second AP 104B to the one or more STAs 106. In some aspects, all transmissions by the first AP 104A to the one or more STAs 106 are non-overlapping in time with transmissions by the second AP 104B to the one or more wireless stations. In an embodiment, the various means for transmitting can comprise a transmitter or a related component, such as one or more of the LBT component 322, the polling component 324, the acknowledgment component 326, the timer 328, the PHY component 340, the handover component, the backhaul interface 360, the transceiver 370, or their functional equivalents.

At block 1630, the first AP 104A, for example, can transmit one or more packets to at least one of the one or more wireless stations on the first wireless communication channel CH1 in accordance with the polling schedule. In some aspects, the polling schedule provides an opportunity for the STAs 106 to receive data from at least one of the packets from the second AP 104B on the second wireless communication channel CH2, in the event that the wireless stations do not receive one of the packets from the first AP 104A.

In some aspects, after transmitting the one or more packets to the STAs 106, the first AP 104A may refrain from transmitting on the first wireless communication channel CH1 (at least to the ULOLAT STAs 106) for the duration of a contention period. This contention period can be utilized by the first AP 104A so as to afford other devices time to transmit on the first wireless communication channel CH1. In an embodiment, the duration of the contention period is based at least in part on whether a preceding transmission by the first AP 104A has been affected by interference in the first wireless communication channel CH1. In an embodiment, means for utilizing can comprise a processor or a transmitter, or a related component, such as one or more of the modem component 320, the LBT component, the polling component 324, the timer 328, the PHY component 340, the handover component 350, the backhaul interface 360, or the transceiver 370, or their functional equivalents.

As part of method 1600, the first AP 104A, for example, may additionally or alternatively determine when to transmit a filler frame to occupy the first wireless communication channel CH1. In some aspects, the determination of when to transmit the filler frame can be based upon determining that a first processing delay of one of the STAs 106 is greater than a DIFS, determining that there is no active transmission by the STAs 106 on the first wireless communication channel CH1, determining that a second transmission slot is not assigned to any of the STAs 106, determining that receipt of an acknowledgment frame from one of the STAs 106 has timed out, or determining that an amount of time remaining in a third transmission slot, after transmission of a DL message, is greater than a DIFS. In some aspects, the polling schedule comprises one or more system cycles including the filler frame and a plurality of transmission slots for communicating with the STAs 106, wherein a duration of each of the one or more system cycles and a duration of each of the plurality of transmission slots is fixed.

As part of method 1600, the first AP 104A, for example, may additionally or alternatively transmit polling information to the wireless stations, the polling information identifying a window during which the wireless stations may send a request to access the wireless communication network 100. The first AP 104A may further receive an UL frame from one of the wireless stations during the window, wherein the UL frame includes the request. In response to receiving the request, the AP 104A may further assign a transmission slot exclusively to the one of the wireless stations. In some aspects, assigning this transmission slot may allow the wireless station to communicate with the AP 104A. In an embodiment, the various means for receiving can comprise a receiver or a related component, such as one or more of the acknowledgment component 326, the PHY component 340, the handover component, the backhaul interface 360, the transceiver 370, or their functional equivalents.

As part of method 1600, the first AP 104A, for example, may additionally or alternatively receive a MAC address of one of the wireless stations, and determine an encryption key of one of the wireless stations. Thereafter, the first AP 104A may generate an encrypted message comprising the MAC address and the encryption key, and broadcast the encrypted message to all APs 104 in the wireless communication network 100. In some aspects, the first AP 104A may also store the MAC address and the encryption key in a list of wireless stations authenticated in the wireless communication network 100. Based at least in part upon the list, the first AP 104A may be able to determine whether a roaming station requesting access from the first AP 104A is already authenticated in the wireless communication network 100. In an embodiment, means for broadcasting can comprise a transmitter or a related component, such as one or more of the PHY component 340, the handover component 350 the backhaul interface 360, the transceiver 370, or their functional equivalents. In an embodiment, means for storing can comprise a processor or memory, or a related component, such as one or more of the modem component 320, the handover component 350, the STA list 352, the neighbor list 354, or their functional equivalents.

As part of method 1600, the first AP 104A, for example, may determine that the first wireless communication channel CH1 is unavailable. In some aspects, the first AP 104A may determine whether it will be able to communicate with the STAs 106 in accordance with the transmission times scheduled in the polling schedule. Once the first AP 104A determines that the channel is unavailable, the first AP 104A may transmit an indication to the second AP 104B to access the second wireless communication channel CH2 early. In some aspects, based on receiving this indication, the second AP 104B can occupy the second wireless communication channel CH2 early with filler frames and start polling the STAs 106 upon the scheduled polling time on the second wireless communication channel CH2.

Figure 17:
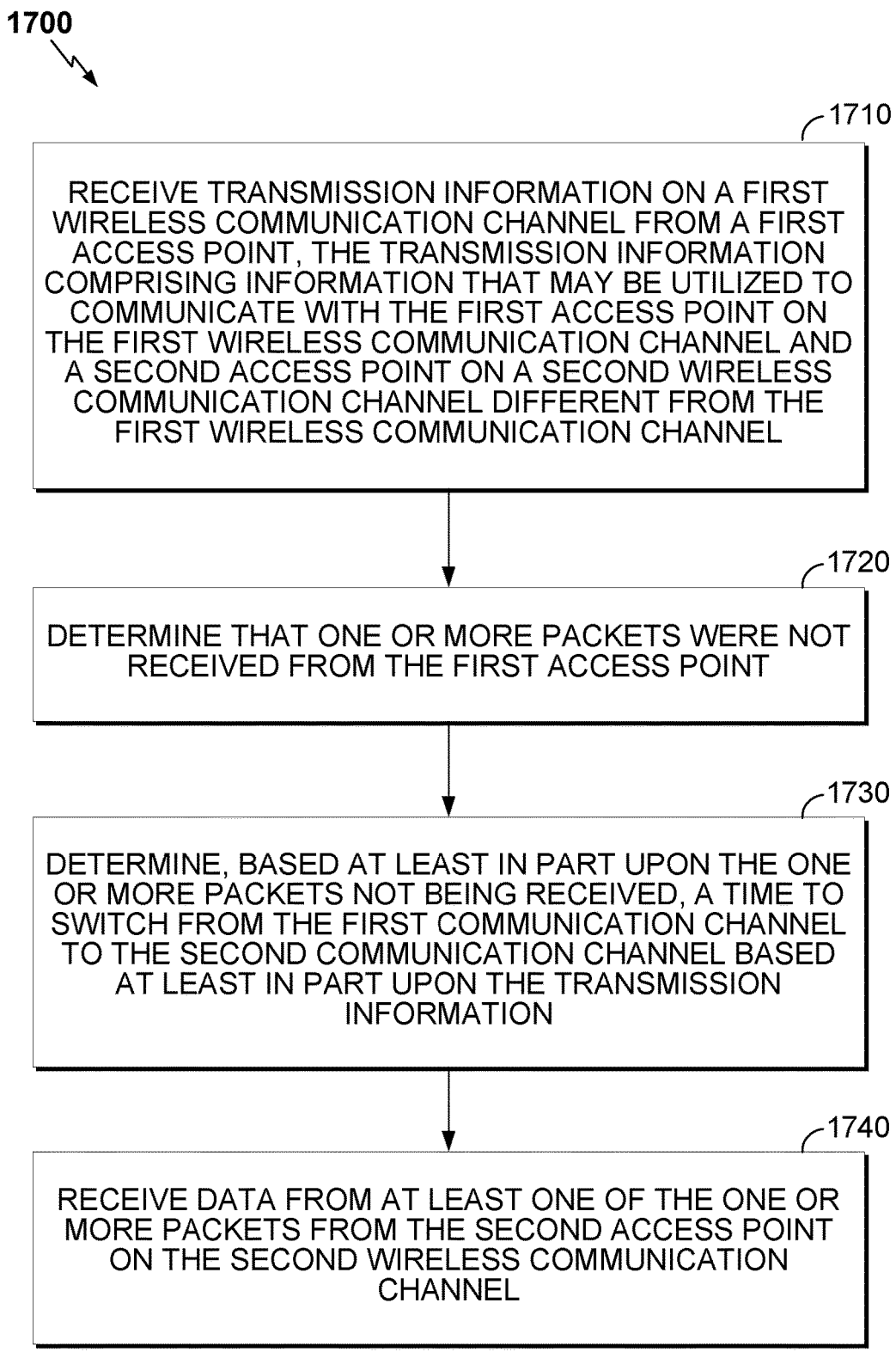
FIG. 17 is a flowchart illustrating another exemplary method of communicating in a wireless communication network, in accordance with an embodiment.

FIG. 17 is a flowchart illustrating another exemplary method 1700 of communicating in a wireless communication network, in accordance with an embodiment. In some aspects, method 1700 may be performed within the wireless communication network 100 of FIG. 1 by one or more of the STAs 106, such as STA 106A. The wireless communication network 100 may contain APs 104, such as AP 104A and AP 104B, operating on wireless communication channel CH1 and wireless communication channel CH2 of FIG. 2, respectively.

Method 1700 may start at block 1710, where the STA 106A, for example, can receive transmission information from a first AP 104A on a first wireless communication channel CH1, wherein the transmission information comprises information for use to communicate with the first AP 104A on the first wireless communication channel CH1 and a second AP 104B on a second wireless communication channel CH2 different from the first wireless communication channel CH1. In some aspects, the first AP 104A and the second AP 104B are in a same wireless communication cell. In some aspects, the transmission information can further comprise at least one of an indication of a MCS for data transmission on the first wireless communication channel CH1, an indication of an expected time to a next update message, an indication of a transmission time offset, or a list of identifiers of neighboring APs 104. In an embodiment, the various means for receiving and the means for monitoring or listening can comprise a receiver or a related component, such as one or more of the application layer 415, at least a portion of the modem component 420, the transceiver 490, or their functional equivalents.

At block 1720, the STA 106A, for example, can determine whether one or more packets were not received from the first AP 104A. Thereafter, at block 1730, the STA 106A, for example, in response to determining that one or more packets was not received, can determine a time to switch from the first wireless communication channel CH1 to the second wireless communication channel CH2 based at least in part upon the transmission information. Accordingly, the STA 106A may utilize the multi-channel transmission of the information to send or receive data from the wireless communication network 100 with a low enough latency to meet its latency target. In an embodiment, the various means for determining can comprise a processor or a related component, such as one or more of the application layer 415, at least a portion of the modem component 420, or their functional equivalents.

At block 1740, the STA 106A, for example, can receive data from at least one of the one or more packets from the second AP 104B on the second wireless communication channel CH2. In some aspects, all transmissions by the first AP 104A to the STA 106A are non-overlapping in time with transmissions by the second AP 104B to the STA 106A (or all ULOLAT STAs 106). In some aspects, the STA 106A may enter a sleep mode for a duration of time after receiving the at least one of the one or more packets and until an additional packet is expected. In an embodiment, the means for entering a sleep mode can comprise a processor, a receiver, a transmitter, or a related component, such as one or more of the application layer 415, at least a portion of the modem component 420, the transceiver 490, or their functional equivalents.

As part of method 1700, the STA 106A, for example, can additionally or alternatively listen to the first wireless communication channel CH1 after receiving the data from the at least one of the one or more packets on the second wireless communication channel CH2. In some aspects, as part of method 1700, the STA 106A, for example, can additionally or alternatively transmit a filler frame to occupy the first wireless communication channel CH1 or the second wireless communication channel CH2. Transmitting the filler frame may allow the ULOLAT devices to capture the first wireless communication channel CH1 or the second wireless communication channel CH2 for the duration of a ULOLAT cycle. In an embodiment, the various means for transmitting can comprise a transmitter or a related component, such as one or more of the application layer 415, at least a portion of the modem component 420, the transceiver 490, or their functional equivalents.

As part of method 1700, the STA 106A, for example, can additionally or alternatively receive polling information from the first AP 104A, the polling information identifying a window during which the wireless station may access the wireless communication network 100. During the window, the STA 106A can receive a DL packet from the first AP 104A via the first wireless communication channel CH1. Additionally or alternatively, during the window, the STA 106A can transmit an UL packet to the first AP 104A replying to the DL packet to join the wireless communication network 100. Additionally or alternatively, during the window, the STA 106A may conditionally receive an acknowledgment from the first AP 104A if the STA 106A successfully joined the wireless communication network 100. In some aspects, prior to X, the STA 106A, for example, can additionally or alternatively receive a plurality of DL frames from a plurality of APs 104, including the first AP 104A, prior to transmitting the UL packet to the first AP 104A. Based upon these received frames, the STA 106A can determine a signal strength of each of the plurality of APs 104, and compare the determined signal strengths to determine which AP 104 has the highest. For example, the first AP 104A may have the highest determined signal strength, and therefore the STA 106A may determine to join the wireless communication network 100 via the first AP 104A.

While aspects for providing a low-latency network are described in connection with a WLAN deployment or the use of IEEE 802.11-compliant networks and related terminology, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for protecting the reception of response frames or messages from interference or similar effects resulting from transmissions by nearby devices may be applicable to any suitable wireless network regardless of the coverage range and the wireless access protocols utilized.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects computer readable medium may comprise non-transitory computer-readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in a wireless communication network comprising:
   determining, by a first access point, a polling schedule, the polling schedule for the first access point to communicate with one or more wireless stations on a first wireless communication channel, the polling schedule for a second access point to communicate with the one or more wireless stations on a second wireless communication channel different from the first wireless communication channel;
   transmitting, by the first access point, on the first wireless communication channel, transmission information to the one or more wireless stations, the transmission information comprising information for the one or more wireless stations to receive a transmission from the second access point on the second wireless communication channel; and
   transmitting, by the first access point, on the first wireless communication channel, one or more packets to at least one of the one or more wireless stations in accordance with the polling schedule.

2. The method of claim 1, wherein the polling schedule comprises a first timing sequence for communication on the first wireless communication channel, and a second timing sequence for communication on the second wireless communication channel, and wherein a time duration of the second timing sequence is the same as a time duration of the first timing sequence except that the second timing sequence is offset in time relative to the first timing sequence.

3. The method of claim 1, wherein a time of the polling schedule for communications by the first access point to the one or more wireless stations is non-overlapping with a time of the polling schedule for communications by the second access point to the one or more wireless stations.

4. The method of claim 1, wherein the one or more wireless stations receives data from at least one of the one or more packets from the second access point on the second wireless communication channel, in an event that the one or more wireless stations do not receive one of the one or more packets from the first access point.

5. The method of claim 1, wherein the first access point and the second access point are in a same wireless communication cell.

6. The method of claim 1, wherein the polling schedule determines a duration of a contention period based at least in part on whether a preceding transmission by the first access point has been affected by interference in the first wireless communication channel, and wherein the first access point does not transmit on the first wireless communication channel for the duration of the contention period.

7. The method of claim 1, further comprising:
   determining, by the first access point, when to transmit a filler frame to occupy the first wireless communication channel, and wherein determining when to transmit the filler frame is based on at least one of:
   determining that a first processing delay of one of the one or more wireless stations is greater than a distributed inter frame space (DIFS);
   determining that there is no active transmission from any of the one or more wireless stations on the first wireless communication channel;
   determining that a second transmission slot is not assigned to any of the one or more wireless stations;
   determining that receipt of an acknowledgment frame from one of the one or more wireless stations has timed out;
   determining that an amount of time remaining in a third transmission slot, after transmission of a downlink message, is greater than a DIFS; and
   wherein the polling schedule comprises one or more system cycles including the filler frame and a plurality of transmission slots for communicating with the one or more wireless stations, wherein a duration of each of the one or more system cycles is fixed, and wherein a duration of each of the plurality of transmission slots is fixed.

8. The method of claim 1, further comprising:
   transmitting, by the first access point, polling information to the one or more wireless stations, the polling information identifying a window during which the one or more wireless stations may send a request to access the wireless communication network;
   receiving an uplink frame, by the first access point, during the window from one of the one or more wireless stations, the uplink frame including the request; and
   assigning, by the first access point, in response to receiving the request, a transmission slot within the polling schedule exclusively to the one of the one or more wireless stations.

9. The method of claim 1, further comprising:
   receiving a medium access control (MAC) address of one of the one or more wireless stations;
   determining an encryption key of one of the one or more wireless stations;
   generating an encrypted message comprising the MAC address and the encryption key;
   broadcasting the encrypted message in the wireless communication network;
   storing the MAC address and the encryption key in a list of the one or more wireless stations authenticated in the wireless communication network; and
   determining whether a roaming station requesting access from the first access point is authenticated in the wireless communication network based at least in part upon the list.

10. The method of claim 1, further comprising:
    determining, by the first access point, that the first wireless communication channel is unavailable; and
    transmitting, by the first access point, based on the first wireless communication channel being unavailable, an indication to the second access point to access the second wireless communication channel earlier than defined by the polling schedule.

11. A first access point configured to communicate with one or more wireless stations on a first wireless communication channel in a wireless communication network, the first access point comprising:
    a processor configured to determine a polling schedule, the polling schedule for the first access point to communicate with the one or more wireless stations, the polling schedule for a second access point to communicate with the one or more wireless stations on a second wireless communication channel different from the first wireless communication channel; and
a transmitter configured to
transmit transmission information on the first wireless communication channel to the one or more wireless stations, the transmission information comprising information for the one or more wireless stations to receive a transmission from the second access point on the second wireless communication channel, and
transmit one or more packets on the first wireless communication channel to at least one of the one or more wireless stations in accordance with the polling schedule,
wherein the polling schedule comprises a first timing sequence for communication on the first wireless communication channel, and a second timing sequence for communication on the second wireless communication channel, and wherein a time duration of the second timing sequence is the same as a time duration of the first timing sequence except that the second timing sequence is offset in time relative to the first timing sequence.

12. The first access point of claim 11, wherein a time for a polling period of the polling schedule for communications by the first access point to the one or more wireless stations is non-overlapping with a time for a polling period of the polling schedule for communications by the second access point to the one or more wireless stations.

13. The first access point of claim 11, wherein the one or more wireless stations receives data from at least one of the packets from the second access point on the second wireless communication channel, in an event that the one or more wireless stations do not receive one of the packets from the first access point.

14. The first access point of claim 11, wherein the first access point and the second access point are in a same wireless communication cell.

15. The first access point of claim 11, wherein the polling schedule determines a duration of a contention period based at least in part on whether a preceding transmission has been affected by interference in the first wireless communication channel, and wherein the processor is further configured to not transmit on the first wireless communication channel for the duration of the contention period.

16. The first access point of claim 11, wherein the processor is further configured to determine when to transmit a filler frame to occupy the first wireless communication channel, and wherein the transmitter is further configured to transmit the filler frame, and wherein the processor is further configured to determine when to transmit the filler frame is based on at least one of:
determining that a first processing delay of one of the one or more wireless stations is greater than a distributed inter frame space (DIFS);
determining that there is no active transmission from any of the one or more wireless stations on the first wireless communication channel;
determining that a second transmission slot is not assigned to any of the one or more wireless stations;
determining that receipt of an acknowledgment frame from one of the one or more wireless stations has timed out; and
determining that an amount of time remaining in a third transmission slot, after transmission of a downlink message, is greater than a DIFS.

17. The first access point of claim 11, further comprising a receiver, wherein:
the transmitter is further configured to transmit polling information to the one or more wireless stations, the polling information identifying a window during which the one or more wireless stations may send a request to access the wireless communication network;
the receiver is configured to receive an uplink frame during the window from one of the one or more wireless stations, the uplink frame including the request; and
the processor is further configured to assign a transmission slot within the polling schedule exclusively to the one of the one or more wireless stations in response to receiving the request.

18. The first access point of claim 11, further comprising:
a memory; and
a receiver configured to receive a medium access control (MAC) address of one of the one or more wireless stations, wherein
the processor is further configured to determine an encryption key of one of the one or more wireless stations and generate an encrypted message comprising the MAC address and the encryption key, and wherein
the transmitter is further configured to broadcast the encrypted message in the wireless communication network, and wherein
the processor is further configured to
store the MAC address and the encryption key in the memory in a list of the one or more wireless stations authenticated in the wireless communication network, and
determine whether a roaming station requesting access to the wireless communication network is authenticated based at least in part upon the list.

19. A method of communicating in a wireless communication network comprising:
receiving, by a wireless station, on a first wireless communication channel, transmission information from a first access point, the transmission information comprising information for the wireless station to communicate with the first access point on the first wireless communication channel and a second access point on a second wireless communication channel different from the first wireless communication channel;
determining, by the wireless station, that one or more packets were not received from the first access point;
determining, by the wireless station, based at least in part upon the one or more packets not being received, a time to switch from the first wireless communication channel to the second wireless communication channel based at least in part upon the transmission information; and
receiving, by the wireless station, data from at least one of the one or more packets from the second access point on the second wireless communication channel.

20. The method of claim 19, further comprising:
monitoring, by the wireless station, the first wireless communication channel after receiving the data from the at least one of the one or more packets on the second wireless communication channel.

21. The method of claim 19, further comprising:
transmitting, by the wireless station, a filler frame to occupy the first or the second wireless communication channel.

22. The method of claim 19, wherein the wireless station enters a sleep mode for a duration of time after receiving the at least one of the one or more packets and until an additional packet is expected.

23. The method of claim 19, further comprising:
receiving, by the wireless station, polling information from the first access point, the polling information identifying a window during which the wireless station may access the wireless communication network;
receiving, by the wireless station, during the window, a downlink packet from the first access point via the first wireless communication channel;
transmitting, by the wireless station, during the window, an uplink packet to the first access point replying to the downlink packet to join the wireless communication network;
conditionally receiving, by the wireless station, during the window, an acknowledgment from the first access point if the wireless station successfully joined the wireless communication network;
receiving a plurality of downlink frames from a plurality of access points including the first access point; and
determining, prior to transmitting the uplink packet to the first access point, a signal strength of each of the plurality of access points, wherein the signal strength of the first access point is the highest from among the plurality of access points.

24. The method of claim 19, wherein the transmission information further comprises at least one of:
an indication of a modulation and coding scheme (MCS) for data transmission on the first wireless communication channel;
an indication of an expected time to a next update message;
an indication of a transmission time offset; and
a list of identifiers of neighboring access points.

25. A wireless station configured to communicate in a wireless communication network, the wireless station comprising:
a receiver configured to receive transmission information from a first access point on a first wireless communication channel, the transmission information comprising information to communicate with the first access point on the first wireless communication channel and a second access point on a second wireless communication channel different from the first wireless communication channel; and
a processor configured to:
determine that one or more packets were not received from the first access point, and
determine, based at least in part upon the one or more packets not being received, a time to switch from the first wireless communication channel to the second wireless communication channel based at least in part upon the transmission information,
the receiver further configured to receive data from at least one of the one or more packets from the second access point on the second wireless communication channel.

26. The wireless station of claim 25, wherein the processor is further configured to monitor the first wireless communication channel after receiving the data from the at least one of the one or more packets on the second wireless communication channel.

27. The wireless station of claim 25, further comprising a transmitter configured to transmit a filler frame to occupy the first or the second wireless communication channel.

28. The wireless station of claim 25, wherein the wireless station enters a sleep mode for a duration of time after receiving the at least one of the one or more packets and until an additional packet is expected.

29. The wireless station of claim 25, further comprising a transmitter, wherein:
the receiver is further configured to:
receive polling information from the first access point, the polling information identifying a window during which the wireless station may access the wireless communication network,
receive a downlink packet during the window from the first access point via the first wireless communication channel,
conditionally receive an acknowledgment during the window from the first access point if the wireless station successfully joined the wireless communication network, and
receive a plurality of downlink frames from a plurality of access points including the first access point;
the transmitter is configured to transmit an uplink packet during the window to the first access point replying to the downlink packet to join the wireless communication network;
the processor is further configured to determine, prior to transmitting the uplink packet to the first access point, a signal strength of each of the plurality of access points, wherein the signal strength of the first access point is highest from among the plurality of access points.

30. The wireless station of claim 25, wherein the transmission information further comprises at least one of:
an indication of a modulation and coding scheme (MCS) for data transmission on the first wireless communication channel;
an indication of an expected time to a next update message;
an indication of a transmission time offset; and
a list of identifiers of neighboring access points.

* * * * *